US012632716B2

(12) United States Patent
Khwa

(10) Patent No.: US 12,632,716 B2
(45) Date of Patent: May 19, 2026

(54) SYSTEM FOR EXECUTING NEURAL NETWORK

(71) Applicant: TAIWAN SEMICONDUCTOR MANUFACTURING CO., LTD., Hsinchu (TW)

(72) Inventor: Win-San Khwa, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 1207 days.

(21) Appl. No.: 17/029,579

(22) Filed: Sep. 23, 2020

(65) Prior Publication Data

US 2021/0125049 A1 Apr. 29, 2021

Related U.S. Application Data

(60) Provisional application No. 62/927,286, filed on Oct. 29, 2019.

(51) Int. Cl.
| | |
|---|---|
| *G06N 3/065* | (2023.01) |
| *G06N 3/04* | (2023.01) |
| *G06N 3/082* | (2023.01) |

(52) U.S. Cl.
CPC .............. *G06N 3/065* (2023.01); *G06N 3/04* (2013.01); *G06N 3/082* (2013.01)

(58) Field of Classification Search
CPC ........... G06N 3/065; G06N 3/04; G06N 3/082
See application file for complete search history.

(56) References Cited

U.S. PATENT DOCUMENTS

| | | | | |
|---|---|---|---|---|
| 10,217,512 | B1 * | 2/2019 | Leobandung | G11C 7/16 |
| 11,620,525 | B2 * | 4/2023 | Vishnu | G06N 3/084 |
| | | | | 706/15 |
| 11,922,299 | B1 * | 3/2024 | Mountain | G06N 3/084 |
| 2018/0046597 | A1 * | 2/2018 | Chen | G06N 3/063 |
| 2018/0174025 | A1 * | 6/2018 | Jin | G06N 3/065 |
| 2018/0181862 | A1 * | 6/2018 | Ikeda | H01L 29/78696 |
| 2018/0285727 | A1 * | 10/2018 | Baum | G06F 12/0207 |
| 2019/0258926 | A1 * | 8/2019 | Abel | G06N 3/065 |
| 2019/0258932 | A1 * | 8/2019 | Kang | G06N 3/04 |
| 2019/0332924 | A1 * | 10/2019 | Cassidy | G06N 3/063 |

(Continued)

OTHER PUBLICATIONS

Srivastava et al. "Dropout: A simple way to prevent neural networks from overfitting", Journal of Machine Learning Research, 2014, vol. 15, pp. 1929-1958.

*Primary Examiner* — Jeremy L Stanley
(74) *Attorney, Agent, or Firm* — Birch, Stewart, Kolasch & Birch, LLP

(57) ABSTRACT

A system includes at least one processor, a memory device and a dropout device. The at least one processor is configured to establish a neural network that comprises a first layer and a second layer. The memory device is coupled to the at least one processor and configured to store a plurality of weight values that are associated with the first layer and the second layer in the neural network. The dropout device is configured to deny an assessment to at least one of the plurality of weight values stored in the memory device, in response to a dropout control signal, and the second layer of the neural network being computed regardless of the at least one of the plurality of weight values that is not accessed. A method is also disclosed herein.

20 Claims, 13 Drawing Sheets

<u>300</u>

(56)                    References Cited

U.S. PATENT DOCUMENTS

| | | | |
|---|---|---|---|
| 2020/0046240 A1* | 2/2020 | Angle | A61B 5/7267 |
| 2020/0150958 A1* | 5/2020 | Ahmed | G06N 3/063 |
| 2020/0202204 A1* | 6/2020 | Kouno | G11C 11/1673 |
| 2020/0218967 A1* | 7/2020 | Strachan | G06N 3/08 |
| 2020/0272893 A1* | 8/2020 | Danial | H03M 1/1038 |
| 2020/0349422 A1* | 11/2020 | Tran | G11C 11/5642 |
| 2020/0364548 A1* | 11/2020 | Chang | G06N 3/063 |
| 2020/0388331 A1* | 12/2020 | Luo | G11C 13/0014 |
| 2021/0064995 A1* | 3/2021 | Pfeil | G06N 3/049 |
| 2021/0142156 A1* | 5/2021 | Tran | G11C 16/10 |
| 2021/0280240 A1* | 9/2021 | Tran | G11C 16/26 |
| 2021/0384193 A1* | 12/2021 | Kimura | G11C 11/401 |
| 2022/0027130 A1* | 1/2022 | Kashmiri | G06N 3/048 |
| 2022/0138546 A1* | 5/2022 | Kwak | G11C 11/2253 |
| | | | 706/33 |
| 2022/0319620 A1* | 10/2022 | Tran | G06F 3/0688 |
| 2023/0132059 A1* | 4/2023 | Kurokawa | H10K 39/32 |
| | | | 257/40 |
| 2023/0138701 A1* | 5/2023 | Toyotaka | G09G 3/20 |
| | | | 345/204 |
| 2023/0274779 A1* | 8/2023 | Yamazaki | G06N 3/048 |
| | | | 365/185.01 |

* cited by examiner

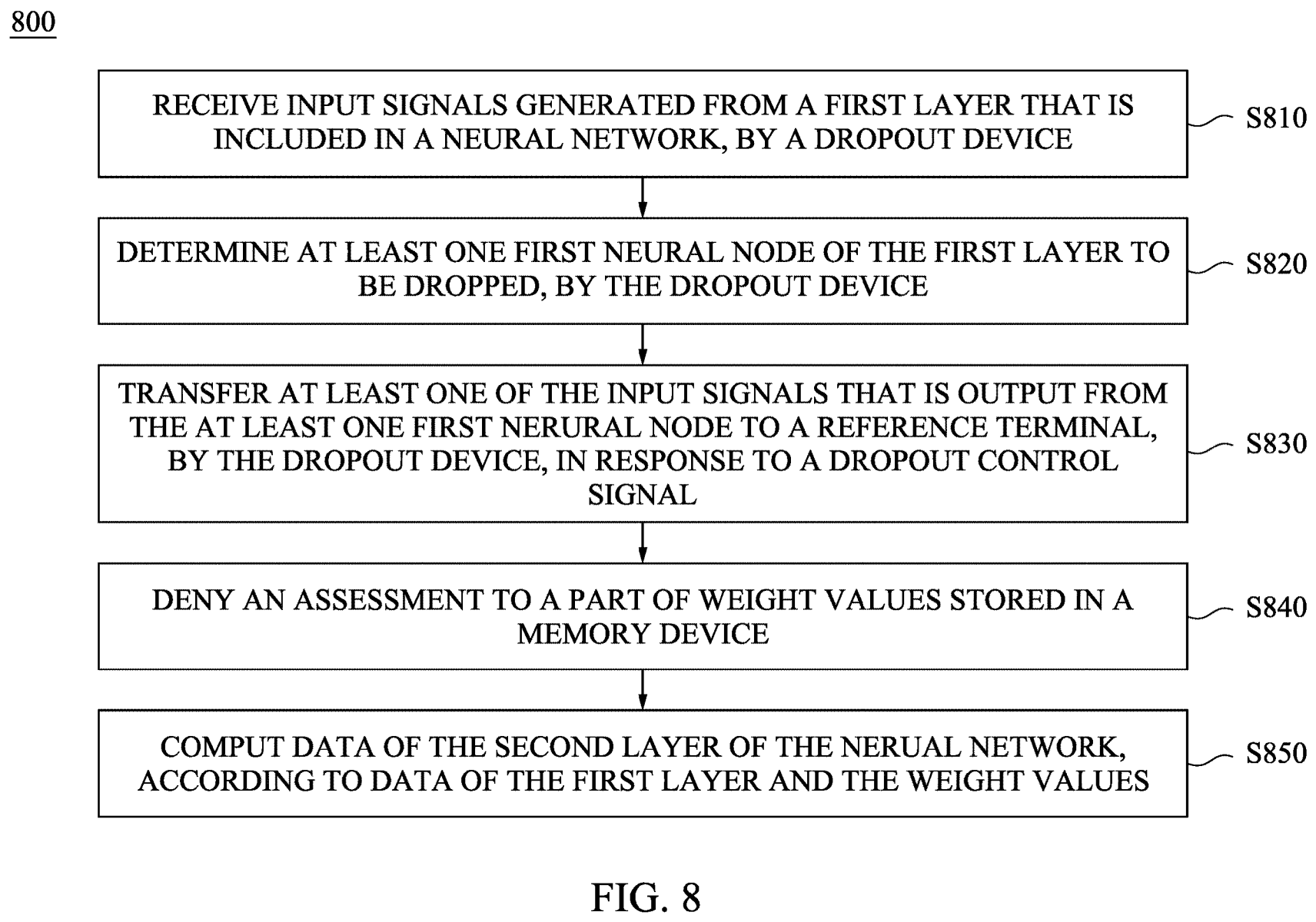

800

S810 — RECEIVE INPUT SIGNALS GENERATED FROM A FIRST LAYER THAT IS INCLUDED IN A NEURAL NETWORK, BY A DROPOUT DEVICE

S820 — DETERMINE AT LEAST ONE FIRST NEURAL NODE OF THE FIRST LAYER TO BE DROPPED, BY THE DROPOUT DEVICE

S830 — TRANSFER AT LEAST ONE OF THE INPUT SIGNALS THAT IS OUTPUT FROM THE AT LEAST ONE FIRST NERURAL NODE TO A REFERENCE TERMINAL, BY THE DROPOUT DEVICE, IN RESPONSE TO A DROPOUT CONTROL SIGNAL

S840 — DENY AN ASSESSMENT TO A PART OF WEIGHT VALUES STORED IN A MEMORY DEVICE

S850 — COMPUT DATA OF THE SECOND LAYER OF THE NERUAL NETWORK, ACCORDING TO DATA OF THE FIRST LAYER AND THE WEIGHT VALUES

FIG. 8

SYSTEM FOR EXECUTING NEURAL NETWORK

CROSS-REFERENCE TO RELATED APPLICATION(S)

This application claims the benefit of U.S. Provisional Application Ser. No. 62/927,286, filed Oct. 29, 2019, which is herein incorporated by reference.

BACKGROUND

Neural networks are computational systems used in machine learning, inspired by biological neural network. The neural networks include plenty of neural nodes that are connected, and the neural nodes are separated into continuous layers, for respective computations. The neural nodes in different layers are connected with weights that are associated with proceeding possibilities therebetween. Typically, in training models of the neural .networks, the weights increase or decrease to adjust the connection strengths between the neural nodes in different layers, thereby, prediction accuracy being improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a flow chart of a method for executing a system corresponding to the system shown in FIG. 2, in accordance with some embodiments of the present disclosure.

DETAILED DESCRIPTION

Figure 1B:
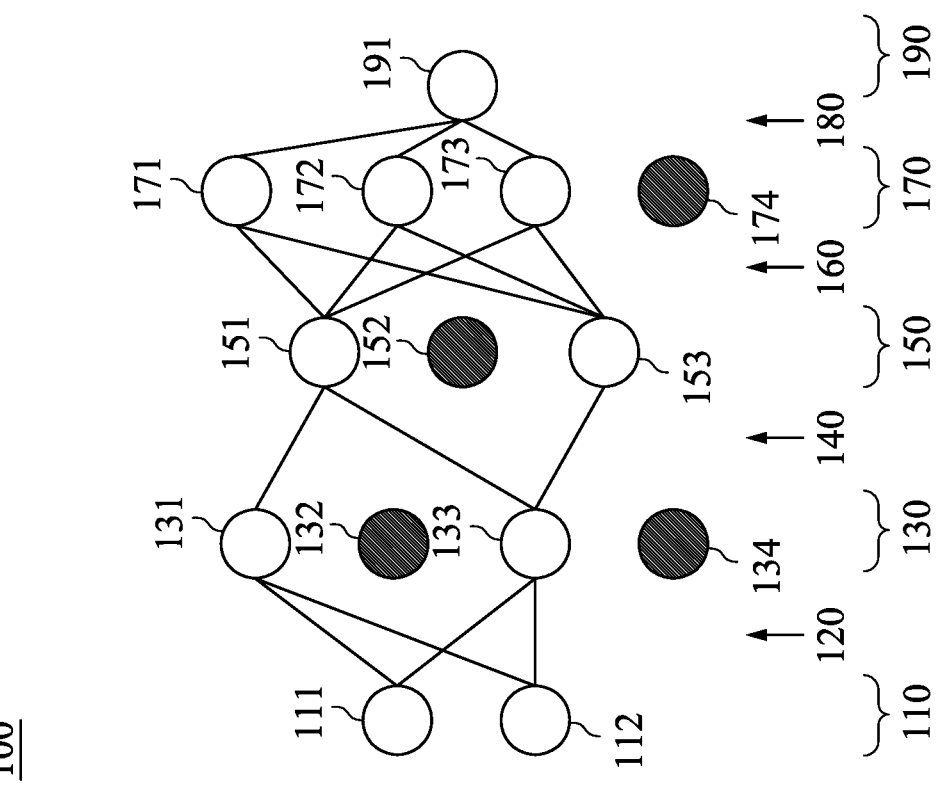
FIG. 1B is a schematic diagram illustrating a neural network applied with dropout, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

In this document, the term "coupled" may also be termed as "electrically coupled", and the term "connected" may be termed as "electrically connected". "Coupled" and "connected" may also be used to indicate that two or more elements cooperate or interact with each other.

Furthermore, spatially relative terms, such as "underlying," "below," "lower," "overlying," "upper" and the like, may be used throughout the description for ease of understanding to describe one element or feature's relationship to another element(s) or feature(s) as illustrated in the figures. The spatially relative terms are intended to encompass different orientations of the device in use or operation in addition to the orientation depicted in the figures. The structure may be otherwise oriented (e.g., rotated 90 degrees or at other orientations) and the spatially relative descriptors used herein may likewise be interpreted accordingly.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

A neural network is a computing architecture applied in machine learning, and is constituted by multiple layers that are connected sequentially. Outputs of a primary layer are provided to next layer, and are indicated as inputs of such next layer. A connection between two adjacent layers is constituted by plenty of edges, and each of the edges is connected between two of neural nodes in these two adjacent layers. The edges have weight values that represent possibilities proceeding from a neural node in a front layer to another neural node in a back layer. The weight values are adjusted by executing training models of the neural network, for optimizing the connections between the neural nodes. The trained models are also indicated as interference models of the neural network, and are configured to infer and predict results from unknown data.

Figure 1A:
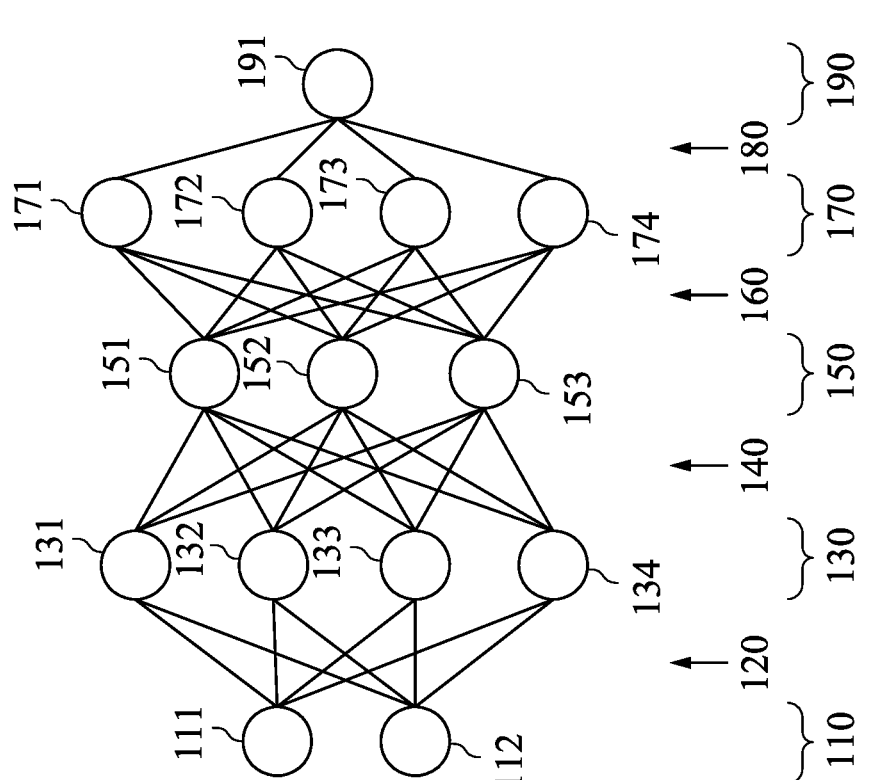
FIG. 1A is a schematic diagram illustrating a neural network, in accordance with some embodiments of the present disclosure.

Reference now made to FIG. 1A. FIG. 1A is a schematic diagram illustrating a neural network 100, in accordance with some embodiments of the present disclosure. The neural network 100 includes an input layer 110, hidden layers 130, 150 and 170, and an output layer 190. A connection 120 between the input layer 110 and the hidden layer 130 is constituted by multiple edges (not labeled) therebetween. Similarly, some other edges (not labeled) between the hidden layers 130 and 150 constitute a connection 140; some other edges (not labeled) between the hidden layers 150 and 170 constitute a connection 160; and other edges (not labeled) between the hidden layer 170 and the output layer 190 constitute a connection 180. For simplicity of illustration, only few layers 110, 130, 150, 170 and 190 are illustrated in the neural network 100. Various numbers of the layers 110, 130, 150, 170 and 190 of the neural network 100 are within the contemplated scope of the present disclosure.

For illustration in FIG. 1A, the input layer 110 includes neural nodes 111 and 112, and each of the neural nodes 111 and 112 is connected to each of neural nodes 131, 132, 133 and 134 included in the hidden layer 130, which is also referred to as the edges of the connection 120. The neural nodes 131, 132, 133 and 134 are further connected through the connection 140 to neural nodes 151, 152 and 153 included in the hidden layer 150, and the neural nodes 151, 152 and 153 are further connected through the connection 160 to neural nodes 171, 172, 173 and 174 included in the hidden layer 170. The neural nodes 171, 172, 173 and 174 are further connected through the connection 180 to a neural node 191 included in the output layer 190. Number and arrangements of the neural nodes 111-112, 131-134, 151-153, 171-174 and 191 in corresponding layers 110, 130, 150, 170 and 190 are given for illustration, various numbers and arrangements of the neural nodes 111-112, 131-134, 151-153, 171-174 and 191 to implement the corresponding layers 110, 130, 150, 170 and 190 are within the contemplated scope of the present disclosure.

Furthermore, the edges of the connections 120, 140, 160 and 180 have respective weight values, and each of the weight values is correlated with two of the neural nodes 111-112, 131-134, 151-153, 171-174 and 191 that are connected to each other in the corresponding layers 110, 130, 150, 170 and 190. For instance, with reference to FIG. 1A, one of the edges of the connection 120 has one weight value, and this weight value is correlated with the neural node 111 in the input layer 110 and the neural node 131 in the hidden layer 130.

In some other embodiments, the neural network 100 has a configuration of a deep belief network (DBN), and the hidden layers 130, 150 and 170 are constituted by stacked restricted Boltzmann machines (RBM). In some other embodiments, the neural network 100 has a configuration of a convolutional neural network (CNN) or a recurrent neural network (RNN). The hidden layers 130, 150 and 170 are constituted by at least one of convolutional layer, pooling layer or fully connected layer.

The neural network 100 illustrated in FIG. 1A is one of the training models, in some embodiments. During training, at least one of the neural nodes in the neuron layers is removed, which is also indicated as "dropout", from the training model temporarily. At least one edge connected to the dropout neural node is therefore removed. Accordingly, the neural network 100 applied with dropout has fewer neural nodes and less complexity, which is discussed below with reference to FIG. 1B.

FIG. 1B illustrates a neural network 100 applied with dropout from the neural network 100 shown in FIG. 1A, in accordance with some embodiments of the present disclosure. With respect to the embodiments of FIG. 1A, like elements in FIG. 1B are designated with the same reference numbers for ease of understanding.

Compared to FIG. 1A, some of the neural nodes are dropout, and these dropout neural nodes are illustrated as colored circles. Specifically, the neural nodes 132 and 134 of the hidden layer 130 are dropout; the neural node 152 of the hidden layer 150 is dropout; and the neural node 174 of the hidden layer 170 is dropout. In addition, the edges connected to the neural nodes 132, 134, 152 and 174 are removed. Accordingly, the neural network 100 shown in FIG. 1B has less complexity compared to that shown in FIG. 1A, to prevent overfitting during the training. Alternatively stated, the neural network 100 disables some of the neural nodes in at least one layer, to zero the weight values that are associated with these disabled neural nodes. The neural network 100 is therefore applied with dropout.

The configuration of the neural network shown in FIG. 1A or 1B is given for illustrative purposes. Various configurations of the neural network 100 shown in FIG. 1A or 1B are within the contemplated scope of the present disclosure. For example, in some embodiments, in addition to the hidden layer 130, 150 or 170, the neural network 100 includes more than three hidden layers.

Figure 2:
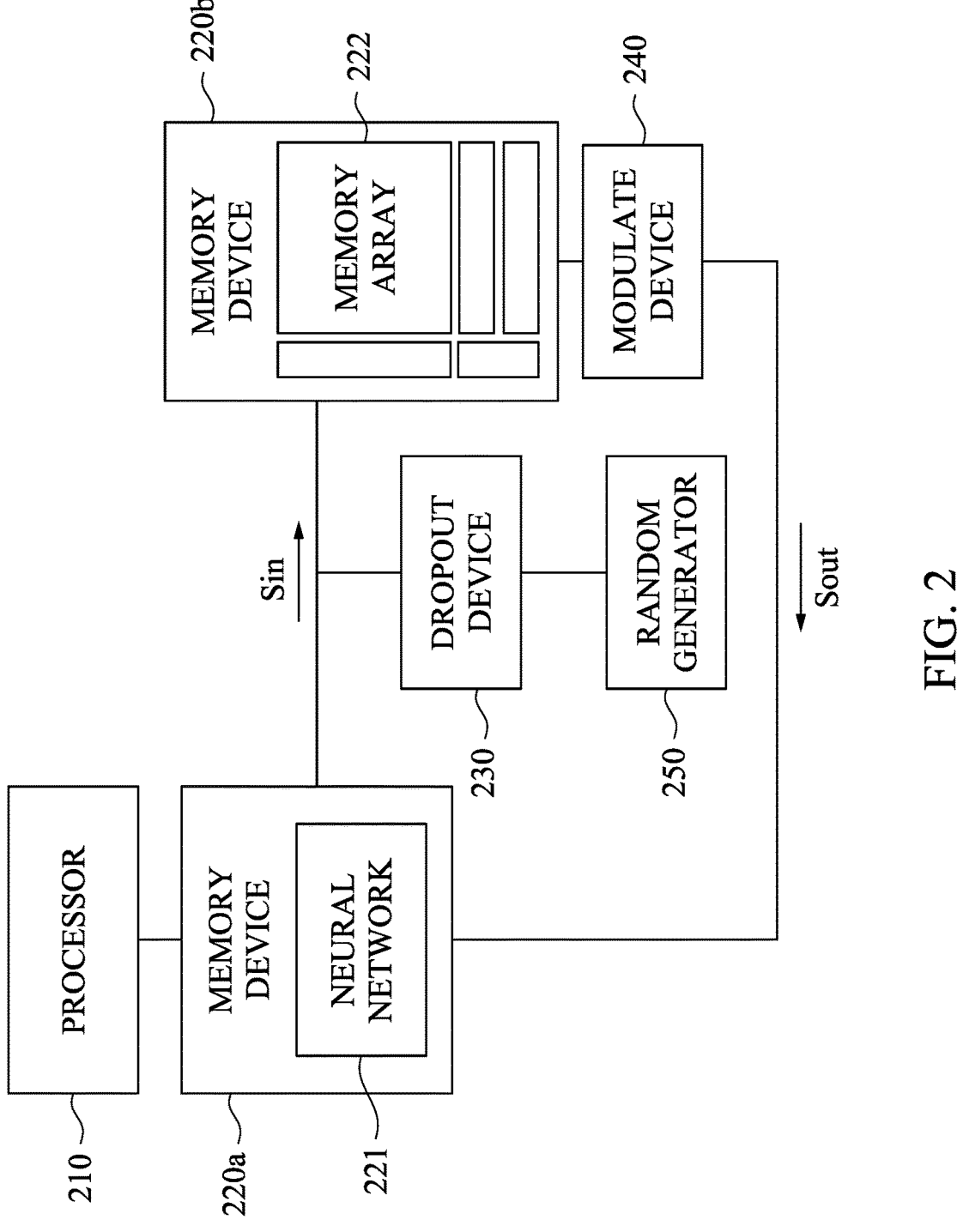
FIG. 2 is a block diagram illustrating a system that is available to execute a neural network corresponding to the neural network shown in FIG. 1A or 1B, in accordance with some embodiments of the present disclosure.

Reference now made to FIG. 2. FIG. 2 is a block diagram illustrating a system 200 that is available to execute a neural network 221, in accordance with some embodiments of the present disclosure. In some embodiments, the neural network 221 corresponds to the neural network 100 shown in FIG. 1A or 1B.

For illustration in FIG. 2, the system 200 includes a processor 210, a memory device 220a including the neural network 221, a memory device 220b including a memory array 222, a dropout device 230, a modulate device 240, and a random generator 250. The processor 210 is connected to the memory device 220a, and is configured to execute the whole system 200. Specifically, the processor 210 is configured to execute the neural network 221, for performing the training or the interference, in some embodiments. In some embodiments, the processor 210 is configured to establish the neural network 221. In various embodiments, the processor 210 is configured to provide or to collect data that are associated with the neural network 221. Furthermore, the memory devices 220a and 220b are connected to each other, and are configured to exchange signals Sin and Sout. The dropout device 230 is connected to the memory devices 220a and 220b, and is further connected to the random generator 250. The modulate device 240 is connected to the memory devices 220a and 220b.

The memory device 220a or 220b is also indicated as memory macro, in some embodiments. The memory macro is a static random access memory (SRAM) macro. In other embodiments, the memory macro is a macro other than SRAM macro. In various embodiments, the memory devices 220a and 220b are integrated together.

In some embodiments, the memory array 222 includes bit cells (not shown) arranged in rows and columns. Each of the bit cells is connected to one of word lines (not shown), and the data transmitted thereof are collected to the neural network 221, for receiving the signal Sin. Each of the bit cells is further connected to one of bit lines (not shown), for transmitting the signal Sout together with the modulate device 240 to be collected back to the neural network 221. In various embodiments, each of the bit cells in the memory array 222 is formed by six transistors (6T-SRAM). Two of the six transistors are connected to the word lines, and are configured to access the remaining transistors. These four remaining transistors are arranged as a pair of invertors that are connected to each other, and are configured to store a bit data which, in some embodiments, is referred to as one weight value discussed with reference to FIGS. 1A and 1B. In some other embodiments, each of the bit cells in the memory array 222 is formed by eight transistors (8T-SRAM).

The configuration of the system 200 shown in FIG. 2 is given for illustrative purposes. Various configurations of the system 200 shown in FIG. 2 available to execute the neural network 221 are within the contemplated scope of the present disclosure. For example, in some embodiments, the memory devices 220a and 220b are integrated together as a memory macro. In alternative embodiments, the memory device 220b, the dropout device 230, and the modulate device 240 are integrated together. In various embodiments, in addition to the processor 210, the system 200 includes more than one processors, for executing the devices included in the system 200.

Figure 3:
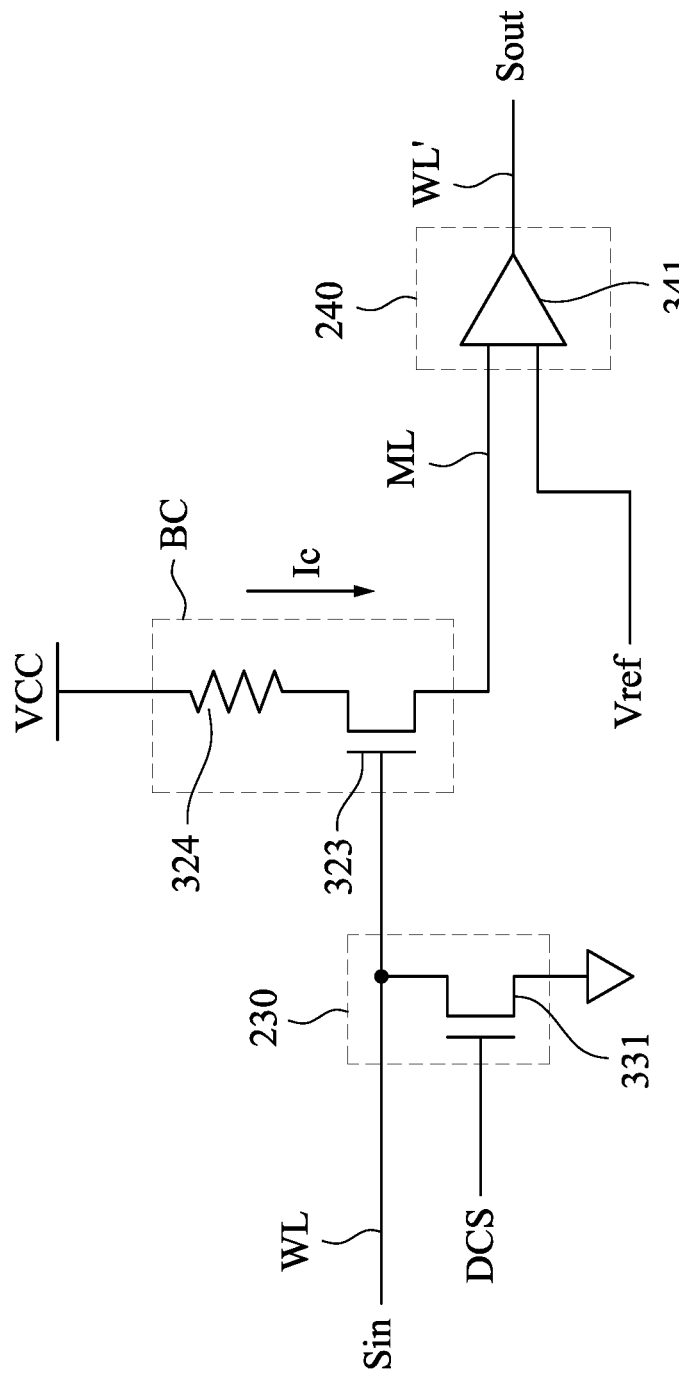
FIG. 3 is a circuit diagram illustrating parts of a system corresponding to the system shown in FIG. 2, in accordance with some embodiments of the present disclosure.

Reference now made to FIG. 3. FIG. 3 is a circuit 300 diagram illustrating parts of a system (not shown), in accordance with some embodiments of the present disclosure. In some embodiments, the system including the circuit 300 corresponds to the system 200 shown in FIG. 2. With respect to the embodiments of FIG. 2, like elements in FIG. 3 are designated with the same reference numbers for ease of understanding.

With reference to FIGS. 2 and 3, the circuit 300 illustrates parts of the system 200, including one bit cell BC in the memory array 222, one dropout cell 331 in the dropout device 230, and one modulate cell 341 in the modulate device 240, in some embodiments. In some other embodiments, the system 200 is implemented by multiple circuits 300 that are arranged and connected in rows and arrays, corresponding to the rows and columns of the memory array 222.

The bit cell BC includes a transistor 323 which, in some embodiments, is n-type metal oxide semiconductor transistor (NMOS transistor) and a resistor 324. One terminal of the resistor 324 is connected to a control circuit (not shown) coupled with a voltage level VCC in the memory device 220b (shown in FIG. 2), and is activated when the bit cell BC is selected by the control circuit. The other one terminal of the resistor 324 is connected to a drain terminal of the transistor 323. A gate terminal of the transistor 323 is connected through a word line WL to the dropout cell 331, and is further connected through the word line WL that the data transmitted thereof are provided from the neural network 221 (shown in FIG. 2). A source terminal of the transistor 323 is connected to the modulate cell 341. In some embodiments, the bit cell BC is implemented by the 6T-SRAM, the resistor 324 is an equivalent resistor of the pair of invertors, and is stored with the weight value. The transistor 323 is an equivalent transistor of two transistors connected to the word line WL, and operated as a switch for accessing or not accessing the weight value.

The dropout cell 331 is implemented by a NMOS transistor 331 hereinafter, in some embodiments. A gate terminal of the transistor 331 is connected to the random generator 250 (shown in FIG. 2), and is configured to receive a dropout control signal DCS. A drain terminal of the transistor 331 is connected to the word line WL, and is further connected to the gate terminal of the transistor 323. A source terminal of the transistor 331 is connected to a reference terminal which, in some embodiments, is a ground. In some embodiments, the transistor 331 is operated as a switch for being turned on or off, in response to the dropout control signal DCS.

The modulate cell 341 is implemented by a comparator device 341 hereinafter, in some embodiments. One of input terminals of the comparator device 341 is connected through modulate line ML to the source terminal of the transistor 323, and the other one of the input terminals of the comparator device 341 is connected to a reference terminal which, in some embodiments, has a reference voltage Vref. Output terminal of the comparator device 341 is connected to a word line WL', and data transmitted thereof are collected into the neural network 221 (shown in FIG. 2). The word line WL' is a portion of the word line WL, and is further connected to another bit cell (not shown) arranged in the next column, in some embodiments. The word line WL' is a metal line that the data transmitted thereof are collected back to the neural network 221, in various embodiments.

The comparator device 341 compares a voltage level of the signal generated from the bit cell BC, which is transmitted through the modulate line ML, with respect to the reference voltage Vref. The comparator device 341 further generates digital data that forms the output signal Sout. The digital data is collected into one of the neural nodes n21-n24 in the layer L2. In some embodiments, the comparator device 341 is configured to modulate a current signal Ic output from the bit cell BC, and to output the output signal Sout, based on the current signal Ic and the reference voltage Vref.

With reference to FIGS. 2 and 3, with consideration of two neural nodes in two adjacent layers in the neural network 221, the input signal Sin is output from the neural network 221, and is transmitted through the word line WL to the drain terminal of the transistor 331 and the gate terminal of the transistor 323. The transistor 331 is driven by the dropout control signal DCS, for bypassing the input signal Sin to the ground or to the gate terminal of the transistor 323. The transistor 323 is driven by the bypassed input signal Sin, for accessing the weight value from the resistor 324 and generating the current signal Ic according to the bypassed input signal Sin and the weight value stored in the resistor 324. In some embodiments, the bypassed input signal Sin controls the gate terminal of the transistor 323, such that amplitude of the current signal Ic is positively correlated with a voltage level of the bypassed input signal Sin. When the voltage level of the bypassed input signal Sin is higher, the amplitude of the current signal Ic is higher. In some embodiments, the weight value is represented with a resistance of the resistor 324. When the resistance of the resistor 324 is lower, the weight value is larger, such that the amplitude of the current signal Ic is higher. When the resistance of the resistor 324 is higher, the weight value is smaller, such that the amplitude of the current signal Ic is lower. In some embodiments, the current signal Ic is affected by both of the voltage level of the bypassed input signal Sin and the resistance of the resistor 324 representing the weight value. In some embodiments, the current signal Ic can be regarded as a product generated from multiplying the bypassed input signal Sin and the weight value. The comparator device 341 generates the output signal Sout by converting the current signal Ic with the reference voltage Vref. The output signal Sout is therefore transmitted back to the neural network 221. The above operations are discussed detailed below with reference to FIGS. 4A-6C, in various embodiments.

Figure 4A:
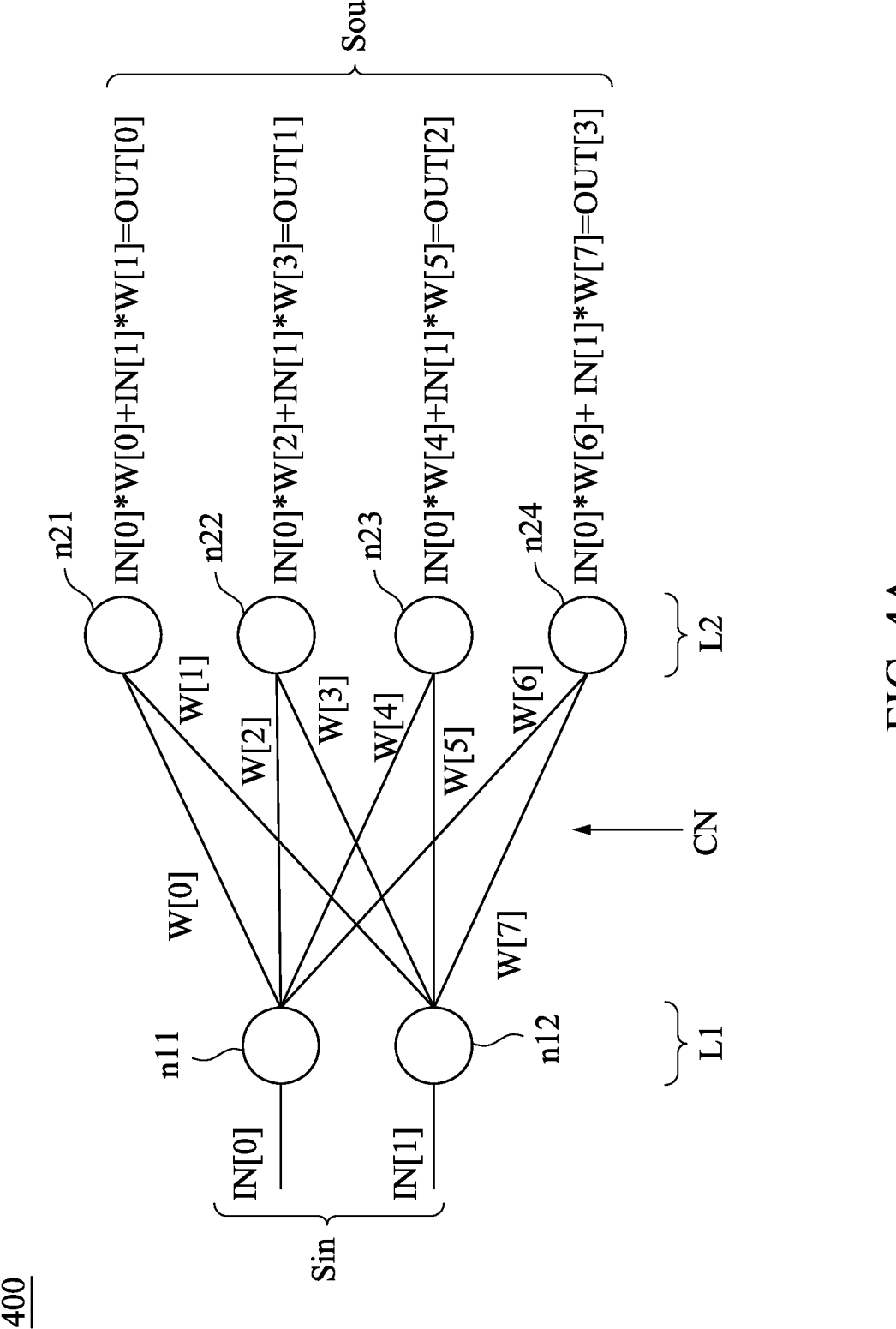
FIG. 4A is a schematic diagram illustrating parts of a neural network corresponding to the neural network included in the system illustrated in FIG. 3, in accordance with some embodiments of the present disclosure.
Figure 4B:
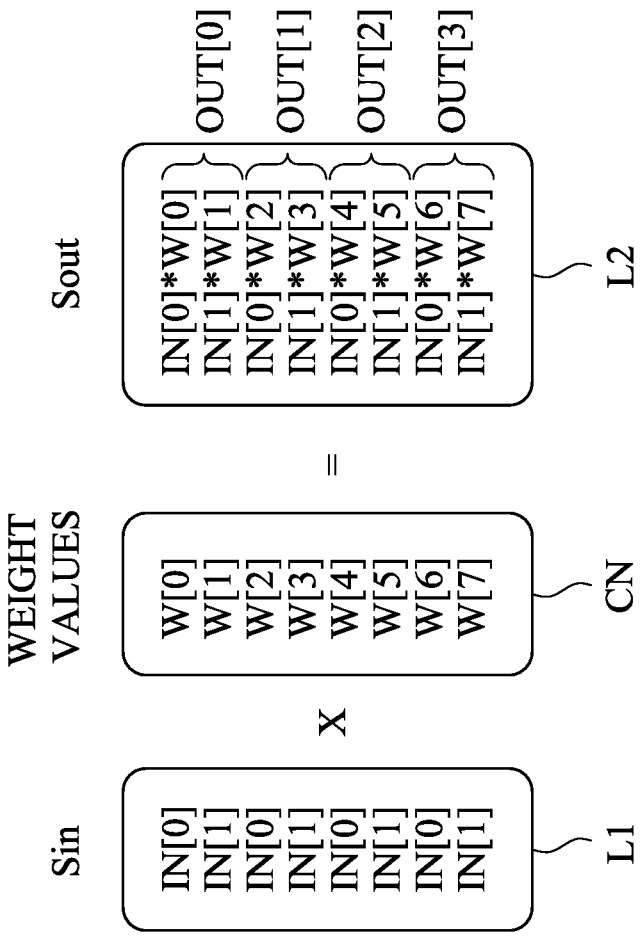
FIG. 4B is a schematic diagram illustrating a relationship between layers shown in FIG. 4A, in accordance with some embodiments of the present disclosure.

Reference now made to FIGS. 4A and 4B. FIG. 4A is a schematic diagram illustrating parts of a neural network 400, in accordance with some embodiments of the present disclosure. In some embodiments, the neural network 400 corresponds to the neural network 221 shown in FIG. 2. In various embodiments, the neural network 400 corresponds to the neural network included in the system illustrated in FIG. 3. In some other embodiments, the neural network 400 corresponds to the neural network 100 shown in FIG. 1A or 1B. FIG. 4B is a schematic diagram illustrating a relationship between layers L1 and L2 shown in FIG. 4A, in accordance with some embodiments of the present disclosure. For ease of understanding, the embodiments with respect to FIGS. 4A and 4B are discussed with reference to FIG. 3, and only illustrate few nodes n11-n24 in two adjacent layers L1 and L2 in the neural network 400.

In some embodiments, the layer L1 or L2 is one of the input layers in the neural network 400. In some other embodiments, the layer L1 or L2 is one of the hidden layers in the neural network 400. In various embodiments, the layer L1 corresponds to the hidden layer 150 shown in FIG. 1A, and the layer L2 corresponds to the hidden layer 170 shown in FIG. 1A.

As illustrated in FIG. 4A, the layer L1 includes the neural nodes n11 and n12. The layer L2 is arranged next to the layer L1 as a subsequent layer, and includes the neural nodes n21, n22, n23 and n24. Alternatively state, the layer L1 is a previous layer, and the layer L2 is a present layer. A connection CN is arranged between the layer L1 and the layer L2, and includes edges (not labeled) that are connected between two of the neural nodes n11-n12 and n21-n24 in different layers L1 and L2, and have respective weight values W[0]-W[7]. Specifically, one of the edges is connected between the neural nodes n11 and n21, and has the weight value W[0]; one of the edges is connected between the neural nodes n12 and n21, and has the weight value W[1]; one of the edges is connected between the neural nodes n11 and n22, and has the weight value W[2]; one of the edges is connected between the neural nodes n12 and n22, and has the weight value W[3]; one of the edges is connected between the neural nodes n11 and n23, and has the weight value W[4]; one of the edges is connected between the neural nodes n12 and n23, and has the weight value W[5]; one of the edges is connected between the neural nodes n11 and n24, and has the weight value W[6]; and one of the edges is connected between the neural nodes n12 and n24, and has the weight value W[7].

Furthermore, in some embodiments, the layer L1 is configured to receive an input signal Sin including input data IN[0] and IN[1]. The layer L2 is configured to receive a signal (not shown) generated from the layer L1, and such signal includes multiple data that are associated with the input data IN[0] and IN[1] and the weight values W[0]-W[7]. The layer L2 is further configured to generate an output signal Sout including output data OUT[0], OUT[1], OUT[2] and OUT[3].

Each of the input signal Sin, the weight values W[0]-W[7], and the output signal Sout is indicated as one dimensional matrix or a mask, in some embodiments. As illustrated in FIG. 4B, the input data IN [0] and IN [1] in the layer L1 are repeated in four times and arranged sequentially, based on a number of neural nodes n21-n24 in the layer L2. The weight values W [0]-W [7] in the connection CN are arranged sequentially, and the weight values W [0]-W [7] corresponds to repeated the input data IN [0] and IN [1] in the layer L1, correspondingly. The output data OUT [0], OUT [1], OUT [2] and OUT [3] in the layer L2 are also arranged sequentially and corresponds to both of the weight values W [0]-W [7] and the input data IN [0] and IN [1].

Furthermore, the layer L2 is generated by applying a matrix calculation between the layer L1 and the connection CN. In some embodiments, with reference to FIG. 4B, the matrix calculation is implemented by multiplication, and is indicated as "X" shown in FIG. 4B. In some other embodiments, the matrix calculation is implemented by other logic calculation, based on algorithms of the neural nodes n21-n24 in the layer L2. Alternatively stated, the output data OUT [0]-OUT [3] in the layer L2 are generated by performing a calculation on the input data IN [0] and IN [1] and the weight values W [0]-W [7]. For example, in some embodiments shown in FIG. 4B, the output data OUT [0] is generated by adding the input data IN [0] multiplied by the weight value W [0] and the input data IN [1] multiplied by the weight value W [1] up. Similarly, the output data OUT [1] is equal to a summation of the input data IN [0] multiplied by the weight value W [2] and the input data IN [1] multiplied by the weight value W [3]; the output data OUT [2] is equal to a summation of the input data IN [0] multiplied by the weight value W [4] and the input data IN [1] multiplied by the weight value W [5]; and the output data OUT [3] is equal to a summation of the input data IN [0] multiplied by the weight value W [6] and the input data IN [1] multiplied by the weight value W [7].

In some embodiments, with reference to FIGS. 3-4B, one of the weight values W[0]-W[7] is stored in the bit cell BC. With such configurations, one of the input data IN[0] or IN[1] is transmitted through the word line WL, and a part of one of the output data OUT[0]-OUT[3] is transmitted through the word line WL'. In an exemplary calculating operation between the neural nodes n11 and n21, in the circuit 300, the input signal Sin has the input data IN[0]. The transistor 331 is turned off, in response to the dropout control signal DCS. The dropout control signal DCS is at logic low which, in some embodiments, being configured to disable the transistor 331. The input signal Sin is continuously transmitted through the word line WL to the transistor 323. The transistor 323 is turned on, in response to the input signal Sin which is at logic high. Therefore, the bit cell BC is activated, and the bit data which, in some embodiments, referred to as the weight value W[0] is accessed.

Subsequently, the current signal Ic having the data including the accessed weight value W [0] and the input signal Sin having the input data IN [0] are together transmitted through the modulate line ML to the comparator device 341. After modulating the signal transmitted from the modulate line ML to being as digital data, the output signal Sout is generated and transmitted through the word line WL'. This output signal Sout has part of the output data OUT [0] that are associated with the input data IN [0] and the weight value W [0] (i.e., "IN [0] *W [0]" shown in a first row of the layer L2 in FIG. 4B).

The number and arrangement of the layers L1 and L2 in the neural network 400 are given for illustrative purposes. Various numbers and arrangements of the layers L1 and L2 are within the contemplated scope of the present disclosure.

Figure 5A:
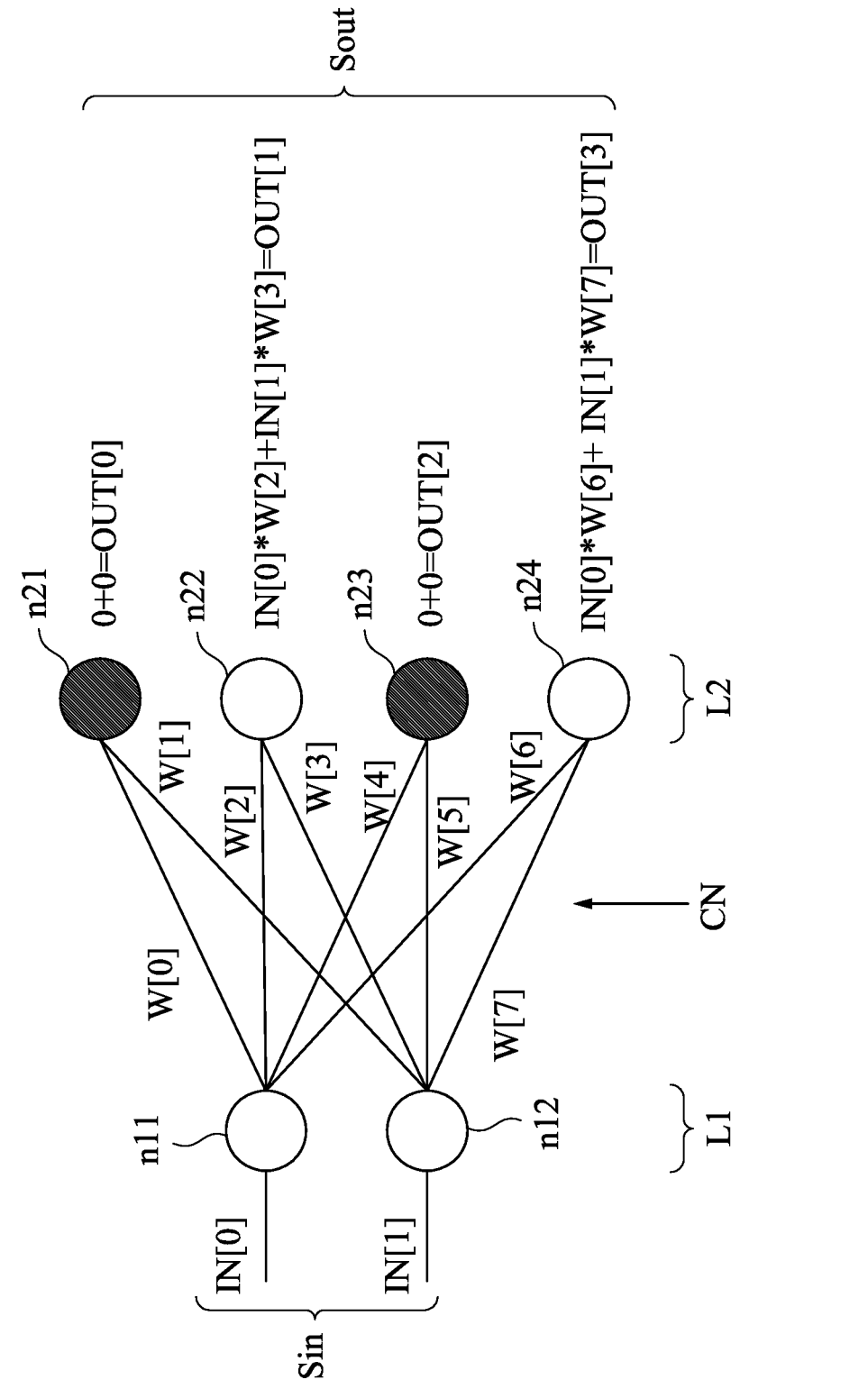
FIG. 5A is a schematic diagram illustrating parts of a neural network that is applied with dropout and corresponds to the neural network included in the system illustrated in FIG. 3, in accordance with some embodiments of the present disclosure.
Figures 5B, 5C:
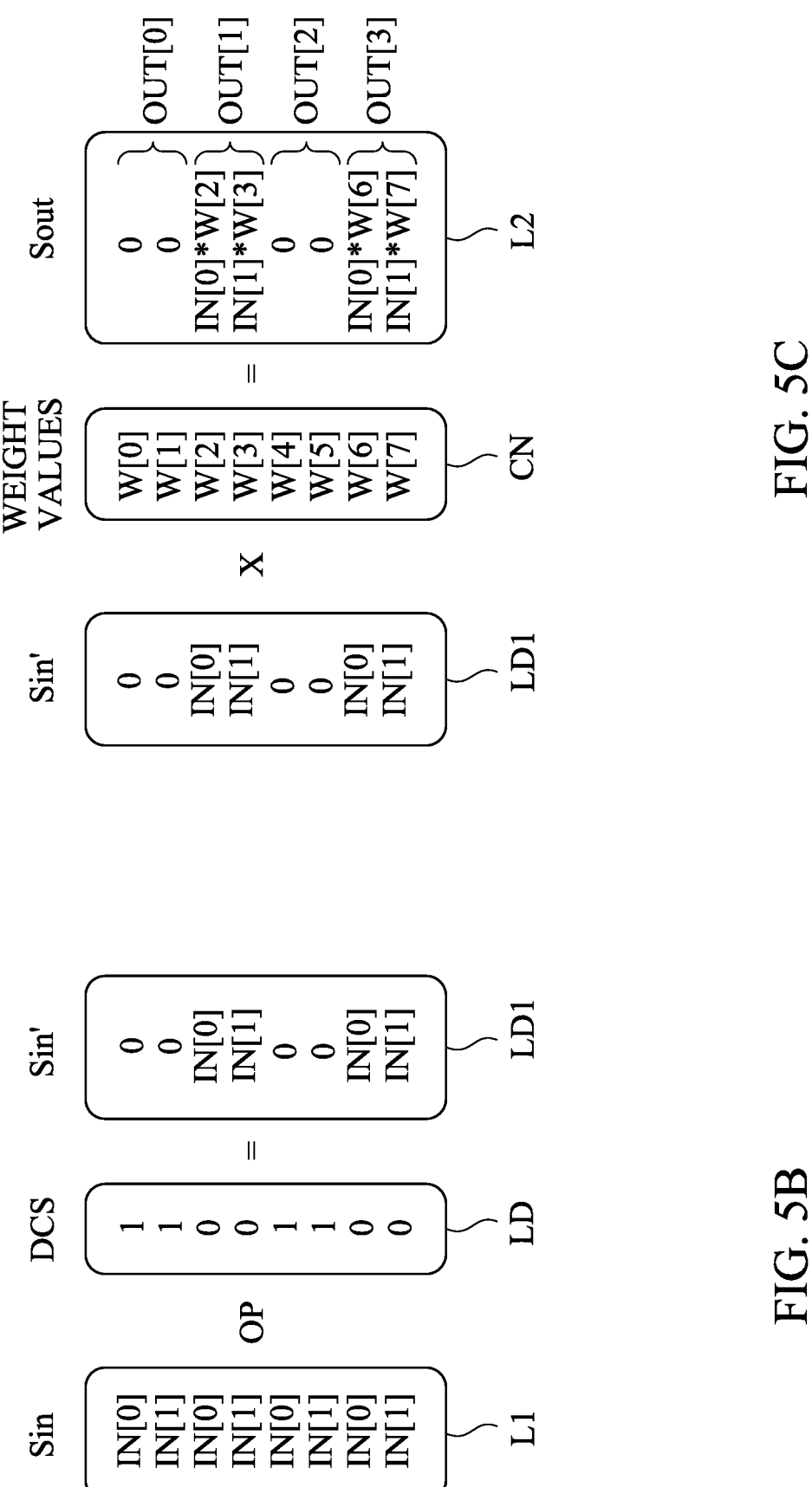
FIGS. 5B-5C are schematic diagrams illustrating a relationship between layers shown in FIG. 5A, in accordance with some embodiments of the present disclosure.

Reference now made to FIGS. 5A-5C. FIG. 5A is a schematic diagram illustrating parts of a neural network 500 that is applied with dropout, in accordance with some embodiments of the present disclosure. FIGS. 5B-5C are schematic diagrams illustrating a relationship between layers L1 and L2 shown in FIG. 5A, in accordance with some embodiments of the present disclosure. In some embodiments, the neural network 500 corresponds to the neural network 221 shown in FIG. 2. In various embodiments, the neural network 500 corresponds to the neural network included in the system illustrated in FIG. 3. In some other embodiments, the neural network 500 is an alternative embodiment of the neural network 400 in FIG. 4A, applied with dropout. The layers L1 and L2 shown in FIGS. 5B-5C are alternative embodiment of that shown in FIGS. 4A-4B, accordingly. As such, similar configurations are not further detailed herein. For ease of understanding, the embodiments with respect to FIGS. 5A-5C are discussed with reference to FIG. 3, and like elements in FIGS. 5A-5C are designated with the same reference numbers with respect to the embodiments of FIGS. 4A-4B.

Compared to embodiments shown in FIG. 4A, the neural nodes n21 and n23 in the layer L2 are dropout, and are indicated as dark circles in FIG. 5A. The edges connected to the neural nodes n21 and n23 are still shown in FIG. 5A, for ease of illustrating the dropout operations. The dropout neural nodes n21 and n23 are disabled and have no functions in the neural network 500. Accordingly, the neural node n21 has no data, and the data included in the neural node n21 is indicated as the output data OUT[0] being equal to zero. Similarly, the neural node n23 has the output data OUT[2] that is equal to zero.

Before performing the matrix calculation on the layer L1 and the connection CN, a dropout calculation is applied to the layer L1. The dropout calculation is performed according to the dropout control signal DCS. As illustrated in FIG. 5B, the dropout control signal DCS is indicated as a mask labeled with "LD", and includes several dropout data corresponding to the data in the layer L1 and the data in the layer L2. These dropout data in the mask LD include "0" which represents non-dropout operation, and include "1" which represents dropout operation. The dropout calculation is performed regarding the layer L1 and the mask LD, and is indicated as "OP" shown in FIG. 5B. It is implemented by hardware-based operations that are discussed in detailed below with further reference to FIG. 3. The input signal Sin' applied with the dropout is therefore generated, and is indicated as a mask labeled with "LD1" in FIGS. 5B-5C. Alternatively stated, the mask LD1 is a layer generated from the layer L1 that is applied with the dropout calculation, before performing the matrix calculation on the connection CN as discussed above with reference to FIG. 4B. In another way to explain, before calculating the layer L1 and the connection CN, the layer L1 is pre-operated by the mask LD, to generate the dropout layer LD1.

In some embodiments, when the dropout data in the mask LD is "1", the input data IN[0] or IN[1] is dropout and becomes to "0" in the dropout layer LD1. The value "0" in the dropout layer LD1 represents empty and has no data. For example, with reference to FIG. 5B, the data in each of the first, second, fifth, and sixth rows of the mask LD is "1", and the data in the corresponding row of the dropout layer LD1 is "0". On the other hand, when the dropout data in the mask LD is "0", the input data IN[0] or IN[1] is not changed and stays the same in the dropout layer LD1. For example, with reference to FIG. 5B, the data in each of the third, fourth, seventh, and eighth rows of the mask LD is "0", and the data in the corresponding row of the dropout layer LD1 is "IN[0]" or "IN[1]", which is the same as the data in the corresponding row of the layer L1.

In some embodiments, the dropout data in the mask LD are arranged with a sequence. The sequence is configured to arrange the dropout data "0" and "1", according to a determination that which neural node(s) n11-n24 is/are dropout during the training. In various embodiments, the determination is generated randomly, and the determination is implemented by the dropout control signal DCS. The dropout control signal DCS is generated by the random generator 250 (shown in FIG. 2), with consideration including, for example, numbers of the neural nodes in the previous layer (e.g., the layer L1) and the present layer (e.g., the layer L2), and a relative arrangement of the dropout neural node(s). Alternatively stated, at least one neural node in the neural network 500 is dropout randomly, and the mask LD is generated based on such randomly dropout result. Therefore, the dropout data in the mask LD are generated and correspond to the data of the dropout neural node in the corresponding layer.

The matrix calculation is continuously performed on the dropout layer LD1 and the connection CN, as illustrated in FIG. 5C, and the layer L2 is therefore generated. Compared to embodiments shown in FIG. 4B, since the data in the first, second, fifth and sixth rows of the layer LD1 are empty, the output data OUT[0] is generated by adding the data "0" multiplied by the weight value W[0] and the data "0" multiplied by the weight value W[1]. Therefore, the data in the first and the second rows of the layer L2 are indicated as "0". Similarly, regarding the data in the fifth and sixth rows of the layer L2, the output data OUT[2] is equal to a summation of the data "0" multiplied by the weight value W[4] and the data "0" multiplied by the weight value W[5]. Accordingly, each of the output data OUT[0] and OUT[2] is empty and is also indicated as "0" in the layer L2. With reference back to FIG. 5A, the dropout neural node n21 has the output data OUT[0], and the output data OUT[0] is equal to "0+0". The dropout neural node n23 has the output data OUT[2], and the output data OUT[2] is also equal to "0+0".

In an exemplary calculating operation between the neural nodes n11 and n21, with reference to FIGS. 3 and 5A-5C, the calculating operation includes dropout calculation illustrated in FIG. 5B and the matrix calculation illustrated in FIG. 5C. The dropout calculation is implemented by a physical hardware, and it is illustrated in the circuit 300, in some embodiments. First of all, applied with the dropout calculation, the input data IN[0] included in the signal Sin is transmitted through the word line WL. The input signal Sin is bypassed to the ground or to the bit cell BC, determined by the dropout device 230. Specifically, when the dropout calculation is applied, the transistor 331 of the dropout device 230 is turned on, in response to the dropout control signal DCS. The dropout control signal DCS is at logic high, for activating the transistor 331. It corresponds to the data in the first row of the dropout mask LD, and is indicated as "1", shown in FIG. 5B. Accordingly, the input signal Sin is bypassed through the transistor 331 to the ground. With such configurations, the transistor 323 of the bit cell BC is turned off, in response to the bypassed input signal Sin, which is at logic low. Therefore, the bit cell BC is deactivated, and the bit data, that is referred to as the weight value W[0], is not accessed. It further corresponds to the data in the first row of the dropout layer LD1, and is indicated as "0", shown in FIG. 5B. It should be noted that the weight value W[0] is not read, and no data is computed in the following calculations rather than zeroing the read weight value W[0] for the proceeding calculations.

The matrix calculation is continuously applied to the dropout input signal Sin' (not shown in FIG. 3). Since the weight value W[0] is not accessed from the bit cell BC, the current signal Ic that corresponds to the dropout input signal Sin' has no data to be transmitted through the modulate line ML. It further corresponds to the data in the first row of the dropout layer LD1, and is indicated as "0", shown in FIG. 5C. Alternatively stated, the current signal Ic shown in FIG. 3 is not generated and is not transmitted through the modulate line ML. The output signal Sout is therefore output from the comparator device 341 of the modulate device 240, based on the reference voltage Vref. The output signal Sout has a digital data, in some embodiments, and is then transmitted through the word line WL' to the neural network 221 (which is shown in FIG. 2). This digital data corresponds to the data in the first row of the layer L2, and is indicated as "0" in FIG. 5C.

In addition, the calculating operation between the neural nodes n12 and n21 is similar to that between the neural nodes n11 and n21 as discussed above with reference to FIGS. 3 and 5A-5C, in some embodiments. In brief, with reference to FIGS. 3 and 5A-5C, the input data IN[1] included in the input signal Sin is bypassed through the transistor 331 to the ground, in response to the dropout control signal DCS having the data at logic high. This data corresponds to that in the second row of the dropout mask LD, and is indicated as "1" in FIG. 5B. Therefore, the corresponding weight value W[1] in the connection CN is not accessed from the bit cell BC. The dropout input signal Sin' has no data to be transmitted through the modulate line ML, and it corresponds to the data in the second row of the dropout layer LD1, and is indicated as "0", shown in FIGS. 5B-5C. The data included in the output signal Sout is therefore transmitted back to the neural network 221 (which is shown in FIG. 2), and such data corresponds to that in the second row of the layer L2, and is indicated as "0" in FIG. 5C. As a result, the output data OUT[0], including the data in the first and the second rows of the layer L2 shown in FIG. 5C, is equal to a summation of zero and zero. It also illustrated in FIG. 5A, and corresponds to the dropout neural node n21. Accordingly, the neural node n21 is dropout, and no data regarding the dropout neural node n21 are further calculated in the neural network 221.

The calculating operation between the neural nodes n11 and n22 or between the neural nodes n12 and n22 is similar to that between the neural nodes n11 and n21 as discussed above with reference to FIGS. 3 and 4A-4B, in some embodiments. In brief, with reference to FIGS. 3 and 5A-5C, the input signal Sin having the input data, corresponding to the input data IN[0] and IN[1] in the third and the fourth row of the input layer L1, is bypassed through the word line WL to the transistor 323, in response to the dropout control signal DCS having the data at logic low. These data included in the dropout control signal DCS correspond to that in the third and the fourth rows of the dropout mask LD, and are indicated as "0" in FIG. 5B. The dropout input signal Sin' therefore have the bypassed input data IN[0] and IN[1] to be transmitted through the modulate line ML. These bypassed input data IN[0] and IN[1] correspond to that in the third and the fourth rows of the dropout layer LD1, shown in FIGS. 5B-5C. Since the input signal Sin is bypassed to the bit cell BC, the weight values W[2] and W[3] are accessed from the bit cell BC and are included in the current signal Ic. Accordingly, the output data OUT[1], including the data in the third and the fourth rows of the layer L2 shown in FIG. 5C, is generated by adding the input data IN[0] multiplied by the weight value W[2] and the input data IN[1] multiplied by the weight value W[3] (i.e., a summation of "IN[0]*W[2]" and "IN[1]*W[3]" shown in the third and the fourth rows of the layer L2 in FIG. 5C). It also illustrated in FIG. 5A, and corresponds to the neural node n22. Accordingly, the neural node n22 is not dropout, and the data regarding the neural node n22 are further calculated in the neural network 221.

In some embodiments, the calculating operation between the neural nodes n11 and n23, or between the neural nodes n12 and n23 is similar to that between the neural nodes n11 and n21 as discussed above with reference to FIGS. 3 and 5A-5C. In some other embodiments, the calculating operation between the neural nodes n11 and n24, or between the neural nodes n12 and n24 is similar to that between the neural nodes n11 and n22 as discussed above with reference to FIGS. 3 and 5A-5C. As such, it is not further detailed herein.

In some approaches, the neural network applied with dropout is implemented by software included in a system, wherein the software is executed by a processor. The weight values are read no matter which one of the weight value corresponding to the neural nodes to be dropout or not, and are subsequently computed by the software. The software may zero the read weight values that are associated with the dropout neural nodes. As such, the read weight values have to be transmitted back to the processor, and then transmitted to the neural network.

Compared to the above approaches, in the embodiments of the present disclosure, for example with reference to FIGS. 3 and 5A-5C, the neural network applied with dropout is implemented by hardware-based system. Specifically, the dropout device 230 is connected between the bit cell BC and the ground, and is configured to bypass the input signal Sin having the data that are associated with the previous layer L1, for controlling the corresponding weight values to be accessed or not. Accordingly, the weight values associated with the dropout neural nodes are not read. Alternatively stated, some of the bit cell stored these weight values are not activated. It decreases energy for activating each of the bit cells, and it further reduces latency for executing the system.

Figure 6A:
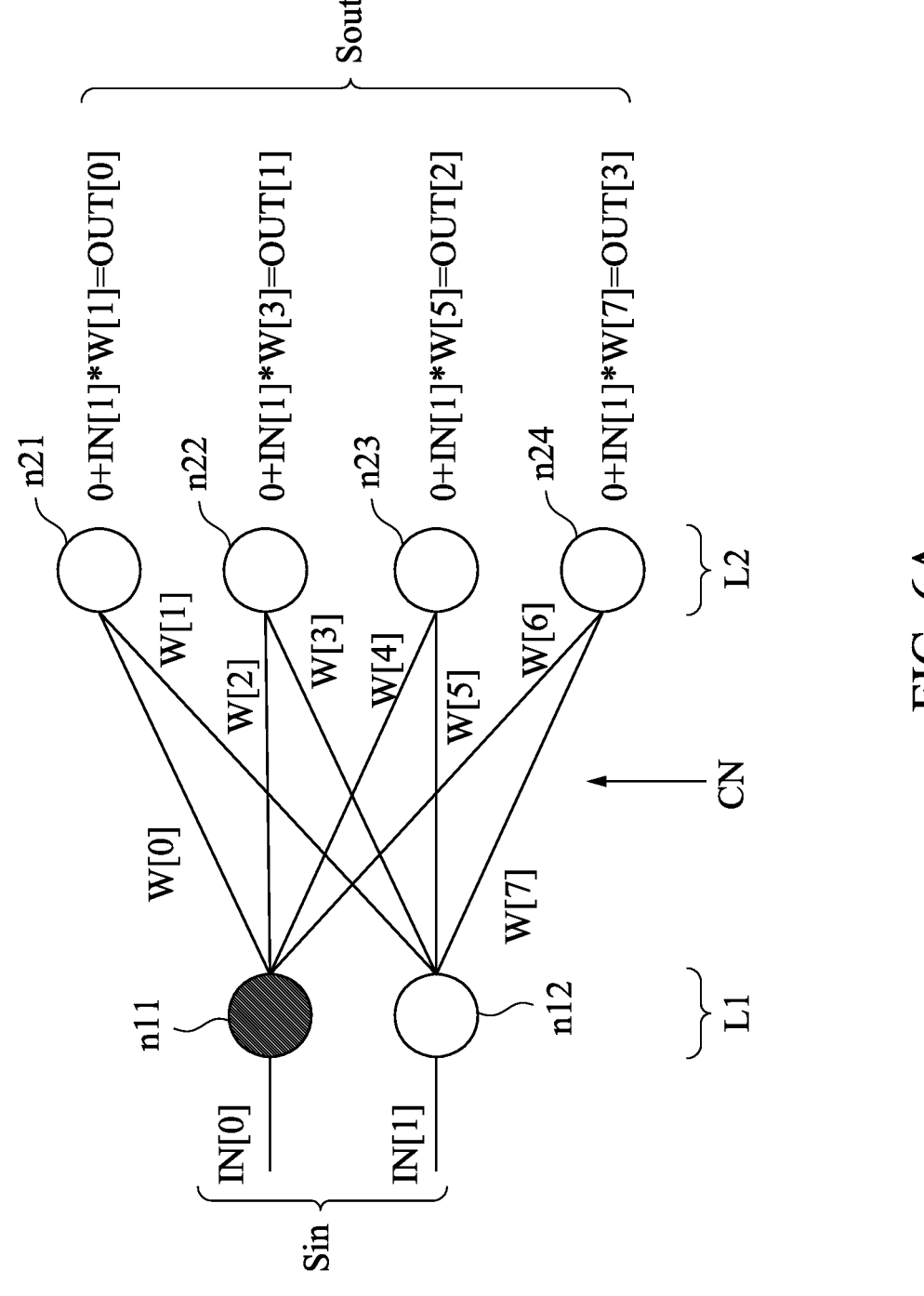
FIG. 6A is a schematic diagram illustrating parts of a neural network that is applied with dropout and corresponds to the neural network included in the system illustrated in FIG. 3, in accordance with some embodiments of the present disclosure.
Figures 6B, 6C:
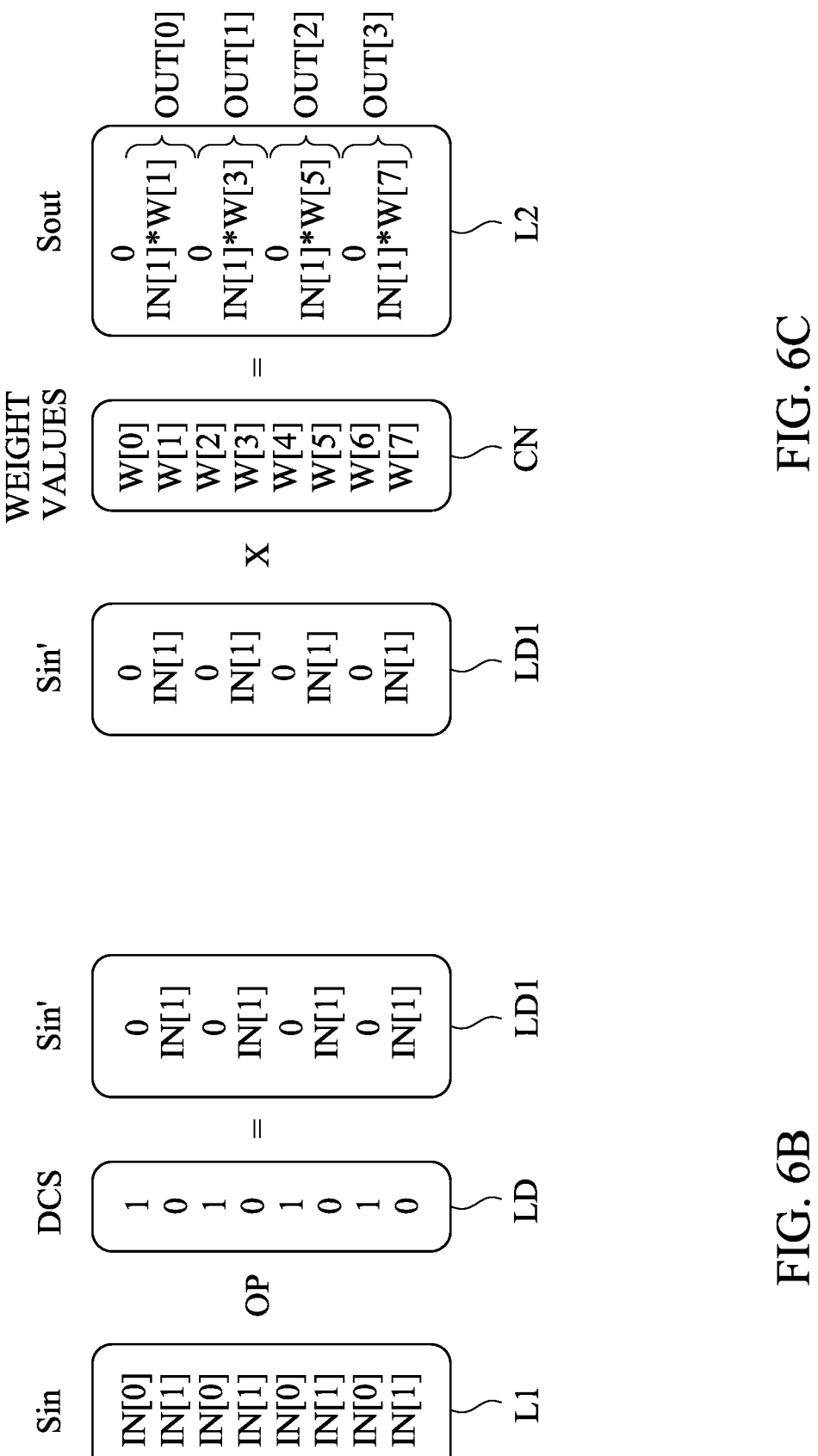
FIGS. 6B-6C are schematic diagrams illustrating a relationship between layers shown in FIG. 6A, in accordance with some embodiments of the present disclosure.

Reference now made to FIGS. 6A-6C. FIG. 6A is a schematic diagram illustrating parts of a neural network 600 that is applied with dropout, in accordance with some embodiments of the present disclosure. FIGS. 6B-6C are schematic diagrams illustrating a relationship between layers L1 and L2 shown in FIG. 6A, in accordance with some embodiments of the present disclosure. In some embodiments, the neural network 600 corresponds to the neural network 221 shown in FIG. 2. In various embodiments, the neural network 600 corresponds to the neural network included in the system illustrated in FIG. 3. In some other embodiments, the neural network 600 is an alternative embodiment of the neural network 500 in FIG. 5A. The layers L1 and L2 shown in FIGS. 6B-6C are alternative embodiment of that shown in FIGS. 5B-5C, accordingly. As such, similar configurations are not further detailed herein. For ease of understanding, the embodiments with respect to FIGS. 6A-6C are discussed with reference to FIG. 3, and like elements in FIGS. 6A-6C are designated with the same reference numbers with respect to the embodiments of FIGS. 5A-5C.

Compared to embodiments shown in FIG. 5A, the neural node n11 in the layer L1 is dropout, and is indicated as a dark circle in FIG. 6A. The edges connected to the neural node n11 is still shown in FIG. 6A, for ease of illustrating the dropout operations. The dropout neural node n11 is disabled and have no functions in the neural network 600. Accordingly, the neural node n11 has no data, and it is indicated as zero (i.e., illustrated as "0") in the corresponding output data OUT[0]-OUT[3].

As illustrated in FIG. 6B, the dropout data in the mask LD includes "0" and "1", for applying the dropout operation on the neural node n11. Compared to embodiments shown in FIG. 5B, the dropout data in the mask LD are different from that shown in FIG. 6B. For example, the second row of the mask LD is "0" shown in FIG. 6B, rather than "1" shown in FIG. 5B. It is configured to access the corresponding input data IN[1] which, in some embodiments, is the weight value W[1]. Furthermore, the data in the dropout layer LD1 includes "0" and "IN[1]", without the input data IN[0], due to the neural node n11 that has the input data IN[0] being dropout. Accordingly, as illustrated in FIG. 6C, the output data OUT[0]-OUT[3] in the layer L2 are generated based on the dropout layer LD1 and the connection CN.

The calculating operation between the neural nodes n11 and n21 is similar to that between the neural nodes n11 and n21 as discussed above with reference to FIGS. 3 and 5A-5C, with the dropout operation. With reference to FIG. 6A, one part of the output data OUT[0] is "0" by zeroing the input data IN[0] from the neural node n11. It also corresponds to the data in the first row of the layer L2, shown in FIG. 6C. In addition, the neural nodes n12 and n21 have a similar calculating operation as the neural nodes n11 and n22 have, with the non-dropout operation. With reference to FIG. 6A, the other part of the output data OUT[0] is "IN[1]*W[1]" by calculating the input data IN[1] from the neural node n12 and the weight value W[1] from the connection CN. It also corresponds to the data in the second row of the layer L2, shown in FIG. 6C. As a result, the data in the neural node n21 is equal to a summation of "0" and "IN[1]" multiplied by the weight value W[1], and such data is also indicated as the output data OUT[0], illustrated in FIGS. 6A and 6C.

In some embodiments, the calculating operation between the neural nodes n11 and one of the neural nodes n22, n23 or n24 is similar to that between the neural nodes n11 and n21 as discussed above with reference to FIGS. 6A-6C. In some other embodiments, the calculating operation between the neural nodes n12 and one of the neural nodes n22, n23 or n24 is similar to that between the neural nodes n12 and n21 as discussed above with reference to FIGS. 6A-6C. As such, it is not further detailed herein.

During the training, the circuit 300 is executed with the neural network including, for example, the neural network 400 shown in FIG. 4A, the neural network 500 shown in FIG. 5A, or the neural network 600 shown in FIG. 6A. In some embodiments, the neural network executed with the circuit 300 is a policy neural network. With such configurations, at least one of the signals input to or output from the neural network is a one dimensional matrix. Alternatively stated, the signals Sin and Sout in the circuit 300 is operated in a digital domain, in various embodiments.

Figure 7:
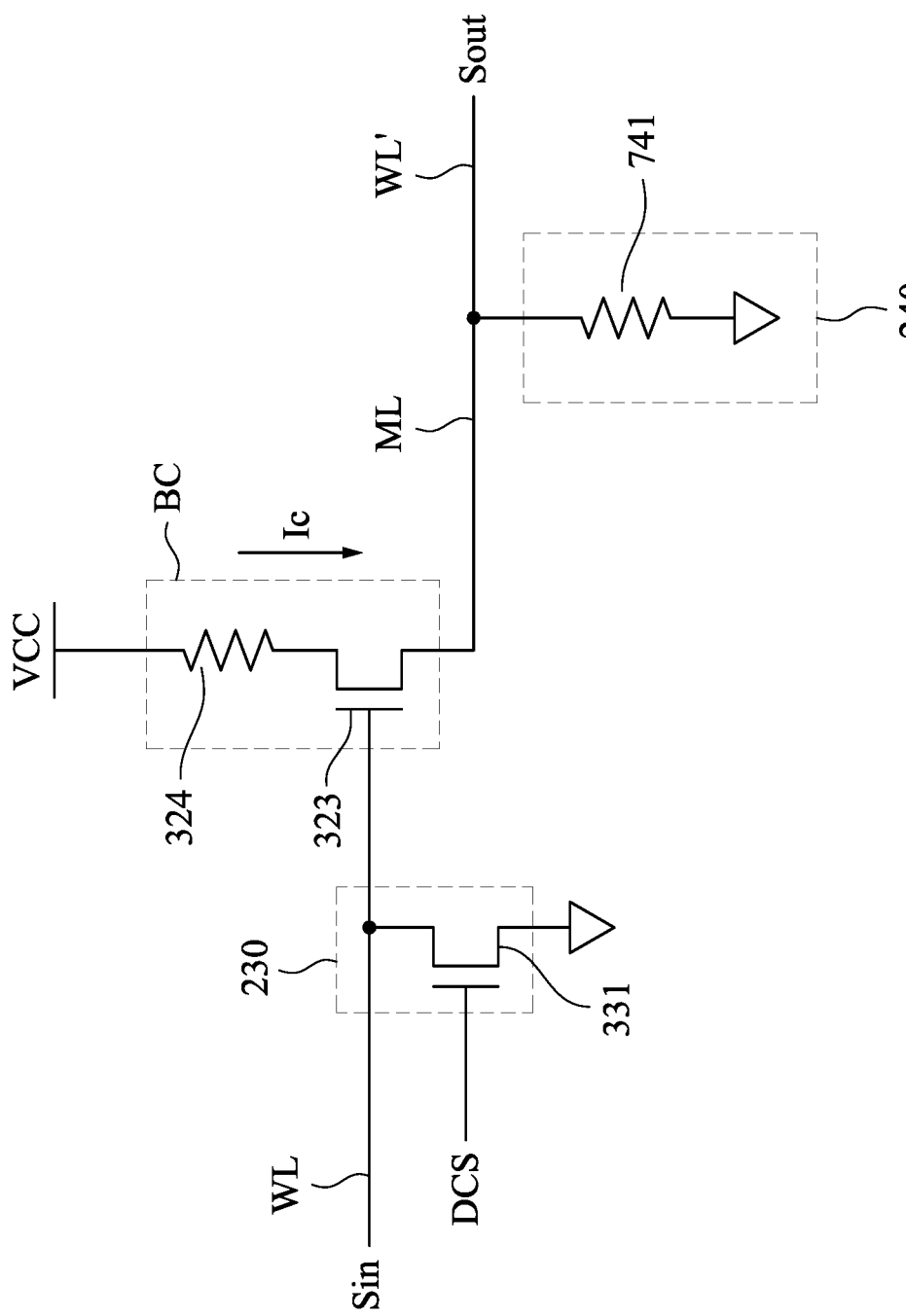
FIG. 7 is a circuit diagram illustrating parts of a system corresponding to the system shown in FIG. 2, in accordance with some embodiments of the present disclosure.

Reference now made to FIG. 7. FIG. 7 is a circuit 700 diagram illustrating parts of a system (not shown), in accordance with some embodiments of the present disclosure. In some embodiments, the system including the circuit 700 corresponds to the system 200 shown in FIG. 2. In various embodiments, the circuit 700 is an alternative embodiment of the circuit 300 shown in FIG. 3. As such, similar configurations are not further detailed herein. For ease of understanding, like elements in FIG. 7 are designated with the same reference numbers with respect to the embodiments of FIG. 3.

Compared to embodiments shown in FIG. 3, the modulate device 240 includes a modulate cell 741. The modulate cell 741 is implemented by a converter device 741 hereinafter, in some embodiments. The converter device 741 is illustrated as a resistor in FIG. 7 for simplicity. One terminal of the converter device 741 is connected through the modulate line ML to the source terminal of the transistor 323. The other terminal of the converter device 741 is connected to a reference terminal which, in some embodiments, is the ground. The converter device 741 is connected to the transistor 323, and the transistor 323 is operated linearly. The converter device 741 is configured to convert the signal output from the bit cell BC into analog data that forms the output signal Sout. The analog data is collected into one of the neural nodes n21-n24 in the layer L2 of the neural network 221 (which is shown in FIG. 2). In some embodiments, the converter 731 is a digital to analog converter (DAC), and is configured to convert the signal that is transmitted through the modulate line ML from a digital format to an analog format. In some other embodiments, the converter 731 is configured to convert the signal with the current signal Ic to the signal with the corresponding voltage signal (not shown).

The circuit 700 is a hardware-based device, and is configured to implement the execution for the calculating operation between two neural nodes in two adjacent layers in the neural network including, for example, the neural network 400 shown in FIG. 4A, the neural network 500 shown in FIG. 5A, or the neural network 600 shown in FIG. 6A, in some embodiments. The calculating operation includes the dropout calculation and the matrix calculation, as discussed above with reference to FIGS. 3-6C. Alternatively stated, at least one of the neural network 400 shown in FIG. 4A, the neural network 500 shown in FIG. 5A, or the neural network 600 shown in FIG. 6A corresponds to the neural network included in the system that includes the circuit 700.

During the training, the neural network executed with the circuit 700 is a convolutional neural network, in some embodiments. With such configurations, at least one of the signals input to or output from the neural network is a tensor. Alternatively stated, the signals Sin and Sout in the circuit 700 is operated in an analog domain, in various embodiments.

Reference now made to FIG. 8. FIG. 8 is a flow chart of a method 800 for executing a system corresponding to the system 200 shown in FIG. 2, in accordance with some embodiments of the present disclosure. In some embodiments, the system executed according to the method 800 corresponds to the system including the circuit 300 shown in FIG. 3 and the neural network 500 shown in FIG. 5A. Following illustrations of the method 800 in FIG. 8 with reference to the circuit 300 in FIG. 3 and the neural network 500 in FIG. 5A include exemplary operations. However, the operations in FIG. 8 are not necessarily performed in the order shown. Alternatively stated, operations may be added, replaced, changed order, and/or eliminated as appropriate, in accordance with the spirit and scope of various embodiments of the present disclosure.

In operation S810, input signals generated from a first layer that is included in a neural network is received, by a dropout device. In the following embodiments, the neural network corresponds to the neural network 500 as illustrated in FIG. 5A, and it is also one part of the neural network 221 as illustrated in FIG. 2. Furthermore, the dropout device corresponds to the dropout device 230 as illustrated in FIG. 3. For illustration, as shown in FIGS. 3 and 5A, one of the input signals which, in some embodiments, is the input signal Sin having the input data IN [0]. The input signal Sin is generated from the layer L1, and is received by the dropout device 230.

In operation S820, at least one first neural node of the first layer is determined to be dropped, by the dropout device. For illustration, as shown in FIGS. 3 and 5A, the neural nodes n21 and n23 are randomly determined to be dropout by the dropout device 230. For simplicity, the following embodiments only illustrate the operation that one neural node n21 is determined to be dropped, and is associated with the neural node n11 of the previous layer L1 and the neural node n21 of a present layer L2.

In operation S830, at least one of the input signals that is output from the at least one first neural node is transferred to a reference terminal, by the dropout device, in response to a dropout control signal. For illustration, as shown in FIGS. 3 and 5A, the input signal Sin including the input data IN [0] is transferred to the ground, by the transistor 331 of the dropout device 230, in response to the dropout control signal DSC. The input signal Sin including the input data IN [0] is output from the neural n11. Specifically, the input data IN [0] is pulled low to the ground, in response to the dropout data "1" included in the dropout control signal DSC, as illustrated in FIG. 5B.

In some embodiments, the operation S830 further includes the following operations, for performing non-dropout operation on other neural nodes. The input signals, excluding the at least one of the input signals that is transferred to the reference terminal, are bypassed to a memory device, in response to the dropout control signal. The memory device corresponds to the memory device including the bit cell BC shown in FIG. 3, which is also corresponds to the memory device 220b shown in FIG. 2, in some embodiments. For illustration, as shown in FIGS. 3 and 5A, the input signal Sin further includes, except for the input data IN[0] that is transferred to the ground, another input data IN[0], that is associated with the neural node n22, is bypassed to the bit cell BC, in response to the dropout control signal DSC. Specifically, the input data IN[0] is bypassed to the bit cell BC, in response to the dropout data "0" included in the dropout control signal DSC, as illustrated in FIG. 5B.

Furthermore, the operation S830 further includes the following operations, in some embodiments. The memory device is activated, for accessing the weight values, excluding the weight value that is associated with the dropped first neural node. For illustration, as shown in FIGS. 3 and 5A, the bit cell BC is activated, for accessing the weight value W[2]. The weight value W[2] does not include the weight value W[0] that is associated with the dropout neural node n21. In addition, the output signals are generated to the second layer, according to the bypassed input signals. For illustration, as shown in FIGS. 3 and 5A, the output signal Sout is generated. In some embodiments, when the input signal Sin having the input data IN[0] is transferred to the ground, the output signal Sout is generated and includes the output data "0" as illustrated in FIG. 5C. In some other embodiments, when the input signal Sin having the input data IN[0] is bypassed to the bit cell BC, the signal Sout is generated and includes the output data that is associated with "IN[0]" as illustrated in FIG. 5C.

In operation S840, an assessment to a part of weight values stored in a memory device is denied. The weight values are associated with the at least one first neural node of the first layer and at least one second neural node of the second layer included in the neural network. For illustration, as shown in FIGS. 3 and 5A, the assessment to the weight value W[0] that is stored in the bit cell BC is denied, since the input signal Sin is transferred to the ground. Alternatively stated, the weight value W[0] is not accessed. In addition, this weight value W[0] is associated with the neural node n11 of the layer L1 and the neural node n21 of the layer L2.

In operation S850, data of the second layer of the neural network are computed, according to data of the first layer and the weight values. For illustration, as shown in FIGS. 3 and 5A, since the neural node n21 is dropout, the output signal Sout without the data associated with the neural node n21 is fed back to the neural network 221 in FIG. 2. This data of the layer L2 is computed, based on the data of the layer L1 and the weight values W[0]-W[7]. Alternatively stated, the neural network 221 is established to perform the training, applied with dropout as illustrated in the operations S810-S840.

Figure 9:
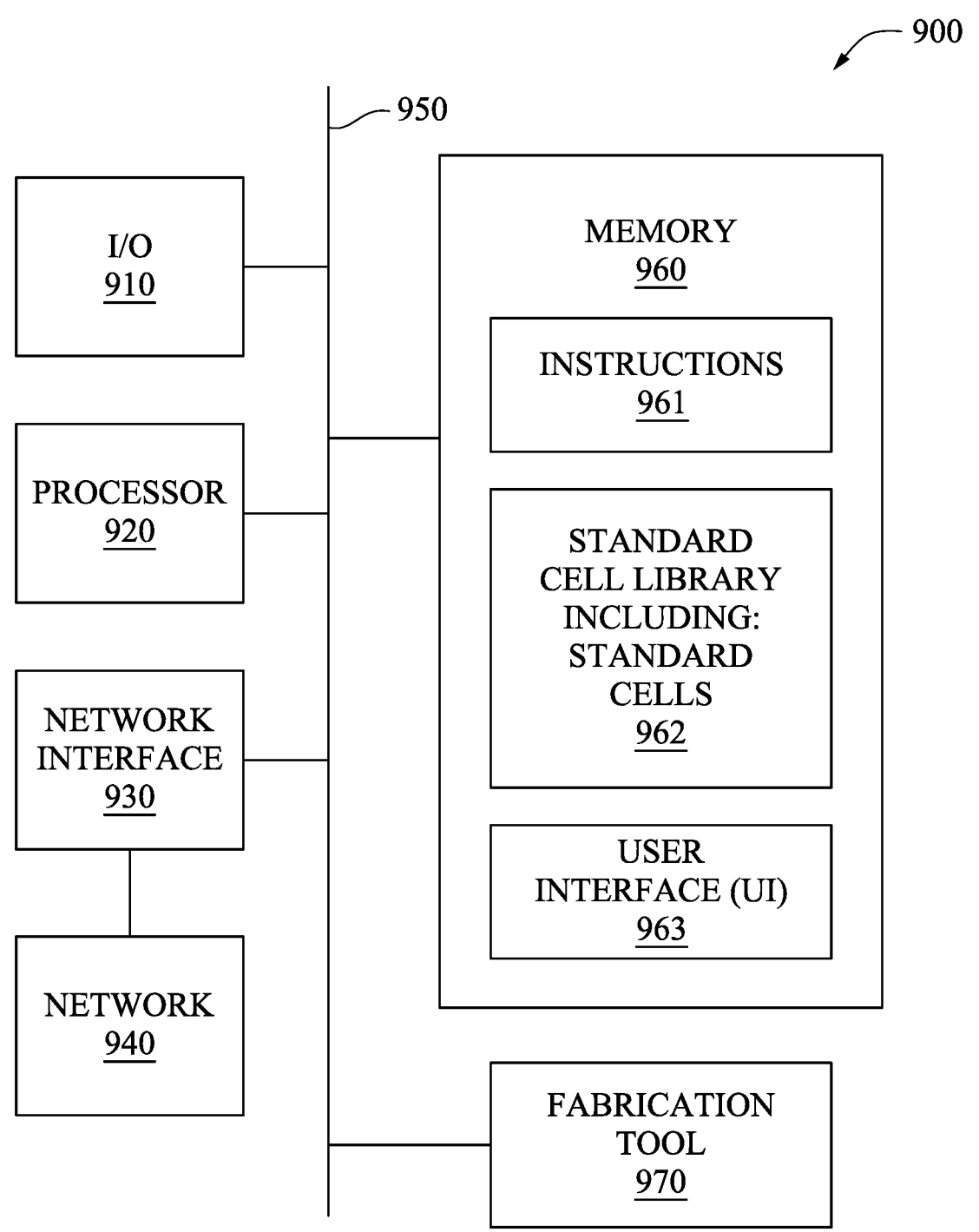
FIG. 9 is a block diagram of a system for designing an IC layout design, in accordance with some embodiments of the present disclosure.

Reference is now made to FIG. 9. FIG. 9 is a block diagram of an electronic design automation (EDA) system 900 for designing the integrated circuit layout design, in accordance with some embodiments of the present disclosure. EDA system 900 is configured to implement one or more operations of the method 800 disclosed in FIG. 8, and further explained in conjunction with FIGS. 2-7. In some embodiments, EDA system 900 includes an APR system.

In some embodiments, EDA system 900 is a general purpose computing device including a hardware processor 920 and a non-transitory, computer-readable storage medium 960. Storage medium 960, amongst other things, is encoded with, i.e., stores, computer program code (instructions) 961, i.e., a set of executable instructions. Execution of instructions 961 by hardware processor 920 represents (at least in part) an EDA tool which implements a portion or all of, e.g., the method 800.

The processor 920 is electrically coupled to computer-readable storage medium 960 via a bus 950. The processor 920 is also electrically coupled to an I/O interface 910 and a fabrication tool 970 by bus 950. A network interface 930 is also electrically connected to processor 920 via bus 950. Network interface 930 is connected to a network 940, so that processor 920 and computer-readable storage medium 960 are capable of connecting to external elements via network 940. The processor 920 is configured to execute computer program code 961 encoded in computer-readable storage medium 960 in order to cause EDA system 900 to be usable for performing a portion or all of the noted processes and/or methods. In one or more embodiments, processor 920 is a central processing unit (CPU), a multi-processor, a distributed processing system, an application specific integrated circuit (ASIC), and/or a suitable processing unit.

In one or more embodiments, computer-readable storage medium 960 is an electronic, magnetic, optical, electromagnetic, infrared, and/or a semiconductor system (or apparatus or device). For example, computer-readable storage medium 960 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 960 includes a compact disk-read only memory (CD-ROM), a compact disk-read/write (CD-R/W), and/or a digital video disc (DVD).

In one or more embodiments, storage medium 960 stores computer program code 961 configured to cause EDA system 900 (where such execution represents (at least in part) the EDA tool) to be usable for performing a portion or all of the noted processes and/or methods. In one or more embodiments, storage medium 960 also stores information which facilitates performing a portion or all of the noted processes and/or methods. In one or more embodiments, storage medium 960 stores library 962 of standard cells including such standard cells as disclosed herein, for example, the bit cell BC discussed above with respect to FIGS. 3 and 7.

EDA system 900 includes I/O interface 910. I/O interface 910 is coupled to external circuitry. In one or more embodiments, I/O interface 910 includes a keyboard, keypad, mouse, trackball, track pad, touch screen, and/or cursor direction keys for communicating information and commands to processor 920.

EDA system 900 also includes network interface 930 coupled to processor 920. Network interface 930 allows EDA system 900 to communicate with network 940, to which one or more other computer systems are connected. Network interface 930 includes wireless network interfaces such as BLUETOOTH, WIFI, WIMAX, GPRS, or WCDMA; or wired network interfaces such as ETHERNET, USB, or IEEE-964. In one or more embodiments, a portion or all of noted processes and/or methods, is implemented in two or more EDA systems 900.

EDA system 900 also includes the fabrication tool 970 coupled to the processor 920. The fabrication tool 970 is configured to fabricate integrated circuits, including, for example, the devices included in the system 200 illustrated in FIG. 2, the circuit 300 illustrated in FIG. 3, the neural network 500 illustrated in FIG. 5A, the neural network 600 illustrated in FIG. 6A, and the circuit 700 illustrated in FIG. 7, based on the design files processed by the processor 920 and/or the IC layout designs as discussed above.

EDA system 900 is configured to receive information through I/O interface 910. The information received through I/O interface 910 includes one or more of instructions, data, design rules, libraries of standard cells, and/or other parameters for processing by processor 920. The information is transferred to processor 920 via bus 950. EDA system 900 is configured to receive information related to a UI through I/O interface 910. The information is stored in computer-readable medium 960 as user interface (UI) 963.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, for example, one or more of an optical disk, such as a DVD, a magnetic disk, such as a hard disk, a semiconductor memory, such as a ROM, a RAM, a memory card, and the like.

Figure 10:
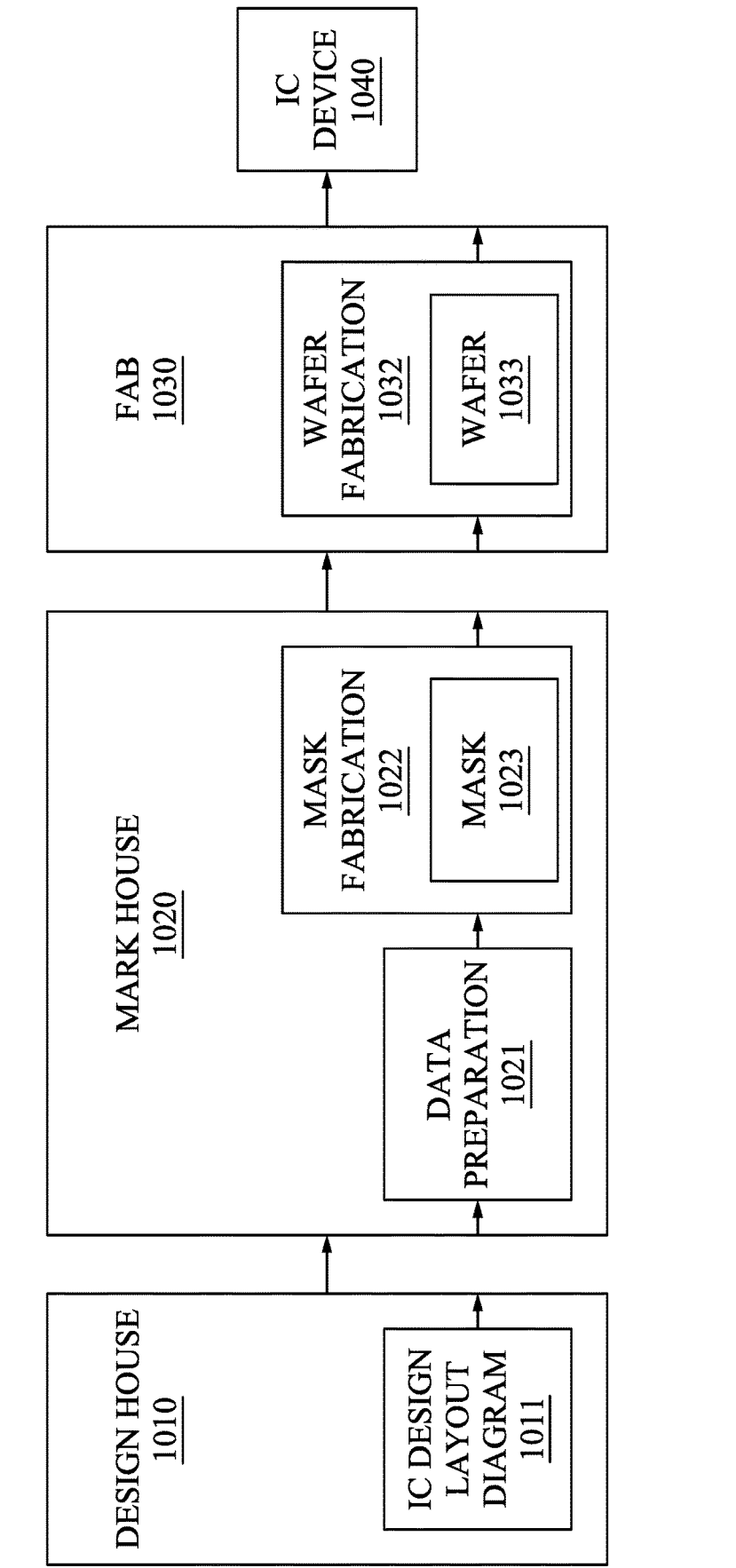
FIG. 10 is a block diagram of an IC manufacturing system, and an IC manufacturing flow associated therewith, in accordance with some embodiments of the present disclosure.

FIG. 10 is a block diagram of IC manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using IC manufacturing system 1000.

In FIG. 10, IC manufacturing system 1000 includes entities, such as a design house 1010, a mask house 1020, and an IC manufacturer/fabricator ("fab") 1030, that interact with one another in the design, development, and manufacturing cycles and/or services related to manufacturing an IC device 1040. The entities in IC manufacturing system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1010, mask house 1020, and IC fab 1030 is owned by a single larger company. In some embodiments, two or more of design house 1010, mask house 1020, and IC fab 1030 coexist in a common facility and use common resources.

Design house (or design team) 1010 generates an IC design layout diagram 1011. IC design layout diagram 1011 includes various geometrical patterns, for example, an IC layout design designed for an IC device 1040, for example, integrated circuits including the devices included in the system 200, the circuit 300, the neural network 500 or 600, and the circuit 700 discussed above with respect to FIG. 2, FIG. 3, FIG. 5A, FIG. 6A, and/or FIG. 7. The geometrical patterns correspond to patterns of metal, oxide, or semiconductor layers that make up the various components of IC device 1040 to be fabricated. The various layers combine to form various IC features. For example, a portion of IC design layout diagram 1011 includes various IC features, such as an active region, gate electrode, source and drain, conductive segments or vias of an interlayer interconnection, to be formed in a semiconductor substrate (such as a silicon wafer) and various material layers disposed on the semiconductor substrate. Design house 1010 implements a proper design procedure to form IC design layout diagram 1011. The design procedure includes one or more of logic design, physical design or place and route. IC design layout diagram 1011 is presented in one or more data files having information of the geometrical patterns. For example, IC design layout diagram 1011 can be expressed in a GDSII file format or DFII file format.

Mask house 1020 includes mask data preparation 1021 and mask fabrication 1022. Mask house 1020 uses IC design layout diagram 1011 to manufacture one or more masks 1023 to be used for fabricating the various layers of IC device 1040 according to IC design layout diagram 1011. Mask house 1020 performs mask data preparation 1021, where IC design layout diagram 1011 is translated into a representative data file ("RDF"). Mask data preparation 1021 provides the RDF to mask fabrication 1022. Mask fabrication 1022 includes a mask writer. A mask writer converts the RDF to an image on a substrate, such as a mask (reticle) 1023 or a semiconductor wafer 1033. The IC design layout diagram 1011 is manipulated by mask data preparation 1021 to comply with particular characteristics of the mask writer and/or requirements of IC fab 1030. In FIG. 10, data preparation 1021 and mask fabrication 1022 are illustrated as separate elements. In some embodiments, data preparation 1021 and mask fabrication 1022 can be collectively referred to as mask data preparation.

In some embodiments, data preparation 1021 includes optical proximity correction (OPC) which uses lithography enhancement techniques to compensate for image errors, such as those that can arise from diffraction, interference, other process effects and the like. OPC adjusts IC design layout diagram 1011. In some embodiments, data preparation 1021 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, data preparation 1021 includes a mask rule checker (MRC) that checks the IC design layout diagram 1011 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1011 to compensate for limitations during mask fabrication 1022, which may undo part of the modifications performed by OPC in order to meet mask creation rules.

In some embodiments, data preparation 1021 includes lithography process checking (LPC) that simulates processing that will be implemented by IC fab 1030 to fabricate IC device 1040. LPC simulates this processing based on IC design layout diagram 1011 to create a simulated manufactured device, such as IC device 1040. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1011.

It should be understood that the above description of data preparation 1021 has been simplified for the purposes of clarity. In some embodiments, data preparation 1021 includes additional features such as a logic operation (LOP) to modify the IC design layout diagram 1011 according to manufacturing rules. Additionally, the processes applied to IC design layout diagram 1011 during data preparation 1021 may be executed in a variety of different orders.

After data preparation 1021 and during mask fabrication 1022, a mask 1023 or a group of masks 1023 are fabricated based on the modified IC design layout diagram 1011. In some embodiments, mask fabrication 1022 includes performing one or more lithographic exposures based on IC design layout diagram 1011. In some embodiments, an electron-beam (e-beam) or a mechanism of multiple e-beams is used to form a pattern on a mask (photomask or reticle) 1023 based on the modified IC design layout diagram 1011. Mask 1023 can be formed in various technologies. In some embodiments, mask 1023 is formed using binary technology. In some embodiments, a mask pattern includes opaque regions and transparent regions. A radiation beam, such as an ultraviolet (UV) beam, used to expose the image sensitive material layer (for example, photoresist) which has been coated on a wafer, is blocked by the opaque region and transmits through the transparent regions. In one example, a binary mask version of mask 1023 includes a transparent substrate (for example, fused quartz) and an opaque material (for example, chromium) coated in the opaque regions of the binary mask. In another example, mask 1023 is formed using a phase shift technology. In a phase shift mask (PSM) version of mask 1023, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1022 is used in a variety of processes. For example, such a mask(s) is used in an ion implantation process to form various doped regions in semiconductor wafer 1033, in an etching process to form various etching regions in semiconductor wafer 1033, and/or in other suitable processes.

IC fab 1030 includes wafer fabrication 1032. IC fab 1030 is an IC fabrication business that includes one or more manufacturing facilities for the fabrication of a variety of different IC products. In some embodiments, IC fab 1030 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1030 uses mask(s) 1023 fabricated by mask house 1020 to fabricate IC device 1040. Thus, IC fab 1030 at least indirectly uses IC design layout diagram 1011 to fabricate IC device 1040. In some embodiments, semiconductor wafer 1033 is fabricated by IC fab 1030 using mask(s) 1023 to form IC device 1040. In some embodiments, the IC fabrication includes performing one or more lithographic exposures based at least indirectly on IC design layout diagram 1011. Semiconductor wafer 1033 includes a silicon substrate or other proper substrate having material layers formed thereon. Semiconductor wafer 1033 further includes one or more of various doped regions, dielectric features, multi-level interconnects, and the like (formed at subsequent manufacturing steps).

In some embodiments, a system is disclosed. The system includes at least one processor, a memory device and a dropout device. The at least one processor is configured to establish a neural network that comprises a first layer and a second layer. The memory device is coupled to the at least one processor and configured to store a plurality of weight values that are associated with the first layer and the second layer in the neural network. The dropout device is configured to deny an assessment to at least one of the plurality of weight values stored in the memory device, in response to a dropout control signal, and the second layer of the neural network being computed regardless of the at least one of the plurality of weight values that is not accessed.

In some embodiments, the memory device includes a memory cell and a first transistor. The memory cell is configured to store one of the plurality of weight values. A first terminal of the first transistor is coupled to the memory cell, and a control terminal of the first transistor is coupled to a word line. The dropout device includes a second transistor. A first terminal of the second transistor is coupled through the word line to the control terminal of the first transistor, and a control terminal of the second transistor is configured to receive the dropout control signal.

In some embodiments, a second terminal of the second transistor is coupled to a first reference terminal. The second transistor is configured to pull low an input signal transmitted through the word line to the first reference terminal or to bypass the control terminal of the first transistor, in response to the dropout control signal. The input signal is generated by the processor according to data from a first neural node in the first layer.

In some embodiments, a second terminal of the first transistor is configured to generating an output signal as a second neural node of the second layer, according to the at least one of the plurality of weight values that is not accessed and the input signal.

In some embodiments, the system further includes a converter device. The converter device is coupled with the first transistor, for converting an output signal generated by the first transistor into analog data. The analog data is collected by the at least one processor into a second neural node in the second layer. The first transistor is operated linearly, according to the input signal.

In some embodiments, the system further includes a comparator device. The comparator device is coupled with the memory device. The comparator device is configured to compare an output signal generated by a first transistor of the memory device with a reference signal and to generate digital data. The digital data is collected by the at least one processor into a second neural node in the second layer.

In some embodiments, in response to the dropout control signal with a first logic level, the dropout device is configured to pull low an input signal generated from the first layer. The pulled low input signal denies the assessment to a first weight value of the plurality of weight values. In response to the dropout control signal with a second logic level, the dropout device is configured to bypass the input signal generated from the first layer to a memory cell of the memory device, for activating the memory cell storing the first weight value. An output signal is generated in reference with the input signal and the first weight value and collected into a second neural node in the second layer.

Also disclosed is a system which includes at least one memory device and a dropout device. The at least one memory device is configured to store a neural network and a plurality of weight values that are associated with the neural network. The neural network includes a first layer and a second layer. The dropout device is coupled to the at least one memory device. The system is executed by at least one processor to operate the following operations: generating an input signal according to data of a first neural node in the first layer; pulling low the input signal or bypassing the input signal to the at least one memory device, in response to a dropout control signal received by the dropout device; denying an assessment to a first weight value of the plurality of weight values stored in the memory device, in response to the pulled low input signal; and generating an output signal to a second neural node in the second layer, according to the bypassed input signal. The first weight value is associated with the first neural node in the first layer and the second neural node in the second layer.

In some embodiments, a first terminal of the dropout device is coupled through a word line to a memory cell of the at least one memory device, and a second terminal of the dropout device is coupled to a first reference terminal. The system is executed by at least one processor to operate the following operations: activating the dropout device, in response to the dropout control signal with a first logic level; and transmitting the input signal from the word line through the activated dropout device to the first reference terminal.

In some embodiments, the system is executed by the at least one processor to operate the following operations: deactivating the dropout device, in response to the dropout control signal with a second logic level different from the first logic level; and transmitting the input signal from the word line through the first terminal of the deactivated dropout device to the at least one memory device.

In some embodiments, a memory cell of the at least one memory device comprises a first transistor and is configured to store the first weight value. A control terminal of the first transistor is coupled through a word line to the first neural node and the dropout device. A first terminal of the first transistor is coupled to a second reference terminal. A second terminal of the first transistor is coupled to through a modulate line to the second neural node.

In some embodiments, the system is executed by the at least one processor to operate the following operations: turning on the first transistor, for accessing the first weight value, when the input signal is bypassed to the control terminal of the first transistor; or turning off the first transistor for not accessing the first weight value, when the input signal is pulled low to a first reference terminal. The output signal is generated from the second terminal of the first transistor and is transmitted through the modulate line to be collected by the at least one processor.

In some embodiments, the dropout device comprises a second transistor that is coupled to the word line. A control terminal of the second transistor is configured to receive the dropout control signal. A first terminal of the second transistor is coupled to the word line and the control terminal of the first transistor. A second terminal of the second transistor is coupled to a first reference terminal.

In some embodiments, the at least one memory device comprises a plurality of memory cells, wherein each of the memory cells is coupled to one of word lines and one of modulating lines, and is configured to store one of the plurality of weight values correspondingly. The input signal is transmitted through one of the word lines to the dropout device and part of the memory cells that are coupled with the one of the word lines. The denying the assessment to the first weight value stored in the memory device further includes the following operations: turning off at least one of the plurality of memory cells that is coupled with the one of the word lines; and bypassing the input signal from the one of the word lines to at least one of the modulating lines that is coupled to the turned off at least one of the plurality of memory cells.

In some embodiments, the system further includes a converter device. The converter device is coupled between the at least one memory device and a second reference terminal. The at least one memory device includes a transistor that is operated linearly and is coupled to the dropout device. The converter device converts an output signal generated by the transistor into analog data. The analog data is collected into a second neural node in the second layer.

In some embodiments, the system further includes a comparator device. The comparator device is coupled between the at least one memory device and a second reference terminal. The at least one memory device includes a switch that is coupled to the dropout device. The comparator device compares a voltage level of the output signal with a voltage on the second reference terminal to generate digital data. The digital data is collected into a second neural node in the second layer.

Also disclosed is a method which includes the following operations: receiving input signals generated from a first layer that is included in a neural network, by a dropout device; determining at least one first neural node of the first layer to be dropped, by the dropout device; transferring at least one of the input signals that is output from the at least one first neural node to a reference terminal, by the dropout device, in response to a dropout control signal; denying an assessment to a part of weight values stored in a memory device, wherein the weight values are associated with the at least one first neural node and at least one second neural node of a second layer that is included in the neural network; and computing data of the second layer of the neural network, according to data of the first layer and the weight values.

In some embodiments, the transferring the at least one of the input signals to the reference terminal further includes the following operations: turning on a transistor of the dropout device, in response to the dropout control signal; and transmitting the at least one of the input signals from at least one of word lines through the turned on transistor to the reference terminal.

In some embodiments, the method further includes the following operations: bypassing the input signals, excluding the at least one of the input signals that is transferring to the reference terminal, to the memory device, in response to the dropout control signal; activating the memory device for accessing the weight values excluding the part of the weight values that is associated with the at least one first neural node and the at least one second neural node; and generating output signals to the second layer, according to the bypassed input signals.

In some embodiments, the method further includes the following operations: modulating the output signals to be operated in an analog domain according to the input signals, by a first modulator device coupled to transistors that are included in the memory device and are operated linearly; or modulating the output signals to be operated in an digital domain according to the input signals, by a second modulator device coupled to the transistors that are included in the memory device and are operated to be logic levels.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
at least one processor configured to establish a neural network that comprises a first layer and a second layer;
a memory device coupled to the at least one processor and configured to store a plurality of weight values that are associated with the first layer and the second layer in the neural network, wherein a memory cell of the memory device comprises:
a resistor; and
a first transistor, wherein a gate terminal of the first transistor is coupled to a word line;
a dropout device coupled to the memory device,
wherein the dropout device is configured to deny an assessment to at least one of the plurality of weight values stored in the memory device, in response to a dropout control signal, and the second layer of the neural network being computed regardless of the at least one of the plurality of weight values that is not accessed, wherein the dropout device comprises:
a second transistor,
wherein the gate terminal of the first transistor is configured to receive an input signal, and a gate terminal of the second transistor is configured to receive the dropout control signal; and
a comparator device,
wherein a first terminal of the first transistor is coupled to the resistor, and a second terminal of the first transistor is coupled to the comparator device,
wherein the input signal is transmitted through the word line to the gate terminal of the first transistor and a drain terminal of the second transistor.

2. The system of claim 1, wherein the resistor is configured to store one of the plurality of weight values,
wherein the drain terminal of the second transistor is coupled through the word line to the gate terminal of the first transistor.

3. The system of claim 2, wherein
a source terminal of the second transistor is coupled to a first reference terminal,
the second transistor is configured to pull low the input signal transmitted through the word line to the first reference terminal or to bypass the gate terminal of the first transistor, in response to the dropout control signal, and the input signal is generated by the at least one processor according to data from a first neural node in the first layer.

4. The system of claim 3, wherein the second terminal of the first transistor is configured to generate an output signal as a second neural node of the second layer, according to the at least one of the plurality of weight values that is not accessed and the input signal.

5. The system of claim 1, wherein the comparator device is coupled with the memory device, wherein the comparator device is configured to compare an output signal generated by the first transistor of the memory device with a reference signal and to generate digital data, and the digital data is collected by the at least one processor into a second neural node in the second layer.

6. The system of claim 1, wherein in response to the dropout control signal with a first logic level, the dropout device is configured to pull low the input signal generated from the first layer, wherein the pulled low input signal denies the assessment to a first weight value of the plurality of weight values, and in response to the dropout control signal with a second logic level, the dropout device is configured to bypass the input signal generated from the first layer to the memory cell of the memory device, for activating the memory cell storing the first weight value, wherein an output signal is generated in reference with the input signal and the first weight value and collected into a second neural node in the second layer.

7. The system of claim 1, wherein when the second transistor is turned off by the dropout control signal, the second transistor bypasses the input signal different from the dropout control signal to the gate terminal of the first transistor, wherein when the second transistor is turned on by the dropout control signal, the second transistor bypasses the input signal different from the dropout control signal to a ground.

8. A system, comprising:

at least one memory device configured to store a neural network and a plurality of weight values that are associated with the neural network, the neural network comprising a first layer and a second layer;

a dropout device coupled to the at least one memory device, wherein the system is executed by at least one processor to operate:

generating an input signal according to data of a first neural node in the first layer;

pulling low the input signal or bypassing the input signal to the at least one memory device, in response to a dropout control signal received by the dropout device;

denying an assessment to a first weight value of the plurality of weight values stored in the memory device, in response to the pulled low input signal; and generating an output signal to a second neural node in the second layer, according to the bypassed input signal, wherein the first weight value is associated with the first neural node in the first layer and the second neural node in the second layer, wherein a memory cell of the at least one memory device comprises a resistor and a first transistor, and a gate terminal of the first transistor is coupled to a word line, wherein the dropout device comprises a second transistor, wherein the gate terminal of the first transistor is configured to receive the input signal, and a gate terminal of the second transistor is configured to receive the dropout control signal; and a comparator device, wherein a first terminal of the first transistor is coupled to the resistor, and a second terminal of the first transistor is coupled to the comparator device, wherein the input signal is transmitted through the word line to the gate terminal of the first transistor and a drain terminal of the second transistor.

9. The system of claim 8, wherein a first terminal of the dropout device is coupled through the word line to the memory cell of the at least one memory device, and a second terminal of the dropout device is coupled to a first reference terminal, and the system is executed by the at least one processor to operate:

activating the dropout device, in response to the dropout control signal with a first logic level; and transmitting the input signal from the word line through the activated dropout device to the first reference terminal.

10. The system of claim 9, wherein the system is executed by the at least one processor to operate:

deactivating the dropout device, in response to the dropout control signal with a second logic level different from the first logic level; and transmitting the input signal from the word line through the first terminal of the deactivated dropout device to the at least one memory device.

11. The system of claim 8, wherein the resistor of the memory cell is configured to store the first weight value, the gate terminal of the first transistor is coupled through the word line to the first neural node and the dropout device, the first terminal of the first transistor is coupled to a second reference terminal through the resistor, and the second terminal of the first transistor is coupled to through a modulate line to the second neural node.

12. The system of claim 11, wherein the system is executed by the at least one processor to operate:

turning on the first transistor, for accessing the first weight value, when the input signal is bypassed to the gate terminal of the first transistor; or turning off the first transistor for not accessing the first weight value, when the input signal is pulled low to a first reference terminal, wherein the output signal is generated from the second terminal of the first transistor and is transmitted through the modulate line to be collected by the at least one processor.

13. The system of claim 11, wherein the second transistor is coupled to the word line, the gate terminal of the second transistor is configured to receive the dropout control signal, the drain terminal of the second transistor is coupled to the word line and the gate terminal of the first transistor, and a source terminal of the second transistor is coupled to a first reference terminal.

14. The system of claim 8, wherein the at least one memory device comprises a plurality of memory cells, wherein each of the plurality of memory cells is coupled to one of word lines and one of modulating lines, and is configured to store one of the plurality of weight values correspondingly, the input signal is transmitted through the one of the word lines to the dropout device and a part of the plurality of memory cells that are coupled with the one of the word lines, and the denying the assessment to the first weight value stored in the memory device further comprises:

turning off at least one of the plurality of memory cells that is coupled with the one of the word lines; and bypassing the input signal from the one of the word lines to the one of the modulating lines that is coupled to the turned off at least one of the plurality of memory cells.

15. The system of claim 8, wherein the comparator device is coupled between the at least one memory device and a second reference terminal, wherein the at least one memory device comprises a switch that is coupled to the dropout device, and the comparator device compares a voltage level of the output signal with a voltage on the second reference terminal to generate digital data, wherein the digital data is collected into a second neural node in the second layer.

16. The system of claim 8, wherein when the second transistor is turned off by the dropout control signal, the second transistor bypasses the input signal different from the dropout control signal to the gate terminal of the first transistor, wherein when the second transistor is turned on by the dropout control signal, the second transistor bypasses the input signal different from the dropout control signal to a ground.

17. A method, comprising:

receiving input signals generated from a first layer that is included in a neural network, by a dropout device;

determining at least one first neural node of the first layer to be dropped, by the dropout device;

transferring at least one of the input signals that is output from the at least one first neural node to a reference terminal, by the dropout device, in response to a dropout control signal;

denying an assessment to a part of weight values stored in a memory device, wherein the weight values are associated with the at least one first neural node and at least one second neural node of a second layer that is included in the neural network; and computing data of the second layer of the neural network, according to data of the first layer and the weight values, wherein a gate terminal of a first transistor of a memory cell of the memory device is coupled to a word line, wherein the gate terminal of the first transistor is configured to receive the at least one of the input signals, and a gate terminal of a second transistor of the dropout device is configured to receive the dropout control signal, wherein a first terminal of the first transistor is coupled to a resistor of the memory cell, and a second terminal of the first transistor is coupled to a comparator device of the memory device, wherein the at least one of the input signals is transmitted through the word line to the gate terminal of the first transistor and a drain terminal of the second transistor.

18. The method of claim 17, further comprising:

bypassing the input signals, excluding the at least one of the input signals that is transferred to the reference terminal, to the memory device, in response to the dropout control signal;

activating the memory device for accessing the weight values excluding the part of the weight values that is associated with the at least one first neural node and the at least one second neural node; and generating output signals to the second layer, according to the bypassed input signals.

19. The method of claim 18, further comprising:

modulating the output signals to be operated in a digital domain according to the input signals, by the comparator device coupled to a plurality of transistors that are included in the memory device and are operated to be logic levels.

20. The method of claim 17, wherein when the second transistor is turned off by the dropout control signal, the second transistor bypasses the at least one of input signals different from the dropout control signal to the gate terminal of the first transistor, wherein when the second transistor is turned on by the dropout control signal, the second transistor bypasses the at least one of input signals different from the dropout control signal to the reference terminal.

* * * * *